United States Patent
Ma et al.

(10) Patent No.: US 8,011,810 B2
(45) Date of Patent: Sep. 6, 2011

(54) LIGHT INTEGRATOR FOR MORE THAN ONE LAMP

(75) Inventors: Joseph Ma, Waterloo (CA); George P. Pinho, Waterloo (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 277 days.

(21) Appl. No.: 12/192,548

(22) Filed: Aug. 15, 2008

(65) Prior Publication Data
US 2009/0168448 A1    Jul. 2, 2009

(51) Int. Cl.
*F21V 7/00* (2006.01)

(52) U.S. Cl. ............ 362/304; 362/560; 362/296.03; 359/831; 359/833

(58) Field of Classification Search ............ 362/304, 362/560, 296.03, 551; 359/831, 833
See application file for complete search history.

(56) References Cited

U.S. PATENT DOCUMENTS

| | | | |
|---|---|---|---|
| 5,586,015 A | 12/1996 | Baldwin et al. | |
| 5,769,844 A | 6/1998 | Ghaffari | |
| 6,200,005 B1 | 3/2001 | Roberts et al. | |
| 6,231,193 B1 | 5/2001 | Sugawara | |
| 6,341,876 B1* | 1/2002 | Moss et al. | 362/268 |
| 6,625,381 B2 | 9/2003 | Roddy et al. | |
| 6,639,652 B1 | 10/2003 | Mori et al. | |
| 7,033,056 B2* | 4/2006 | Andersen et al. | 362/554 |
| 7,252,393 B1 | 8/2007 | Ma et al. | |
| 7,338,187 B2* | 3/2008 | Li | 362/297 |
| 7,437,034 B2* | 10/2008 | Gerets et al. | 385/36 |
| 7,505,205 B2* | 3/2009 | Sacre et al. | 359/618 |
| 2004/0090763 A1 | 5/2004 | Li et al. | |
| 2005/0052873 A1 | 3/2005 | Sokolov | |
| 2005/0083685 A1* | 4/2005 | Yeh et al. | 362/227 |
| 2005/0174658 A1 | 8/2005 | Long et al. | |

(Continued)

FOREIGN PATENT DOCUMENTS

EP     0 629 813 A1    6/1994

(Continued)

OTHER PUBLICATIONS

European Search Report issued Dec. 11, 2009 in corresponding European Application No. 09 25 1995.

(Continued)

*Primary Examiner* — Evan Dzierzynski
(74) *Attorney, Agent, or Firm* — Staas & Halsey LLP

(57) ABSTRACT

A light integrator is provided, the light integrator comprising a body for integrating light, the body having a length and a light egress end. The light integrator further comprises a first light entrance device for accepting light from a first lamp into the body, the first light entrance device comprising a first light entrance face, the first light entrance device located distal the light egress end. The light integrator further comprises a second light entrance device for accepting light from a second lamp, the second light entrance device comprising a second light entrance face, the second light entrance device laterally displaced from the first light entrance device in a direction generally perpendicular to the first light entrance face, such that light from the first and second lamps independently enter the integrator via the first and second light entrance devices respectively, and exit the light egress end. The second light entrance device is further displaced from the first light entrance device along the body towards the light egress end, such that each of the first and second lamps may displaced from one another along the body.

19 Claims, 24 Drawing Sheets

U.S. PATENT DOCUMENTS

| | | | |
|---|---|---|---|
| 2006/0139730 A1* | 6/2006 | Oehler et al. | 359/291 |
| 2006/0285087 A1* | 12/2006 | Huang | 353/94 |
| 2006/0285807 A1 | 12/2006 | Lu et al. | |
| 2008/0123343 A1* | 5/2008 | Kobayashi et al. | 362/298 |
| 2008/0174994 A1* | 7/2008 | Liao et al. | 362/231 |
| 2009/0168426 A1 | 7/2009 | Ma | |

FOREIGN PATENT DOCUMENTS

| | | |
|---|---|---|
| EP | 1 306 697 A1 | 6/1995 |
| EP | 0 864 897 A2 | 9/1998 |
| EP | 1 469 252 A2 | 10/2004 |
| EP | 1 617 284 A1 | 1/2006 |
| EP | 1617284 | 1/2006 |
| EP | 1 667 469 | 6/2006 |
| GB | 229039 | 2/1925 |
| GB | 2 378 499 | 2/2003 |
| JP | 2005-85768 | 3/2005 |
| WO | 99/64784 | 12/1999 |
| WO | 01/71249 A1 | 9/2001 |

OTHER PUBLICATIONS

Notice of Allowance issued Dec. 31, 2010 in corresponding U.S. Appl. No. 12/003,492.
U.S. Appl. No. 60/500,688, filed Sep. 8, 2003, Sokolov.
European Search Report issued on Nov. 10, 2008 in corresponding European Patent Application 08252211.1.
European Search Report mailed Apr. 14, 2009 and issued in corresponding European Patent Application 08253139.2.
Office Action issued Nov. 9, 2009 in related U.S. Appl. No. 12/003,492.
European Search Report dated Oct. 22, 2010 in corresponding European Patent Application 10008664.4.
European Office Action dated Apr. 6, 2011 in corresponding European Patent Application 08 254 139.2.

* cited by examiner

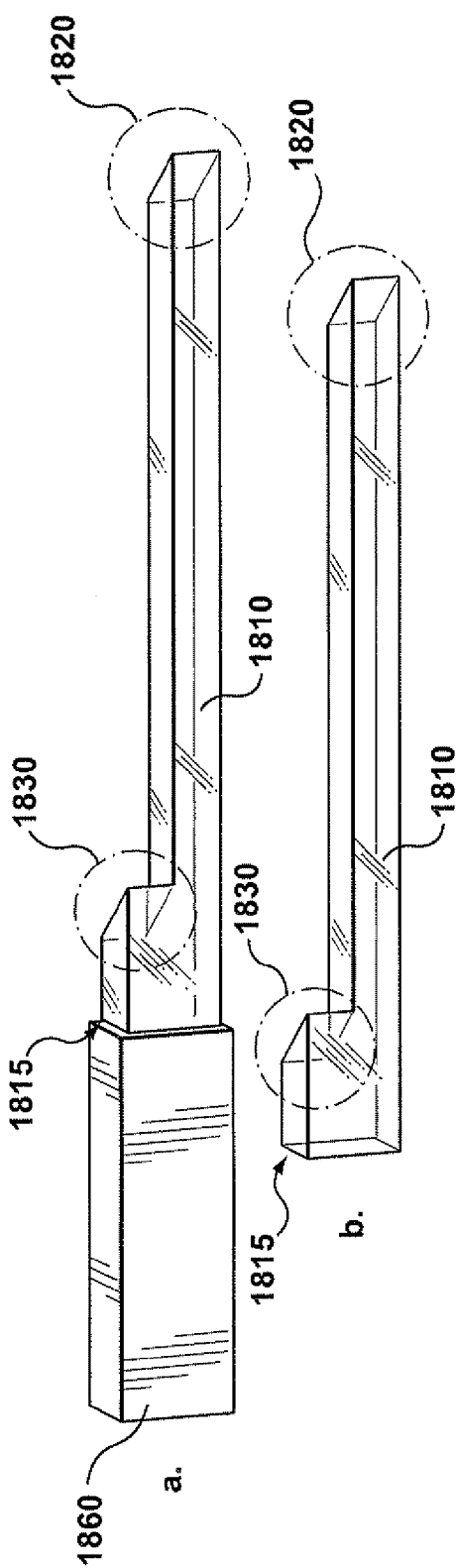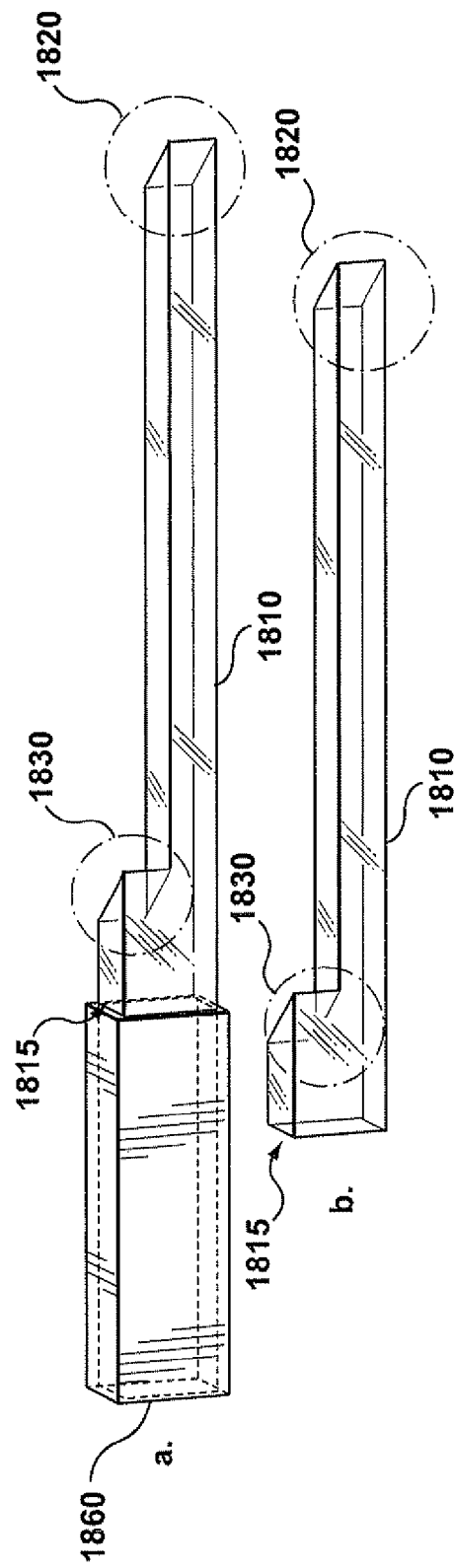
FIG. 20
FIG. 21

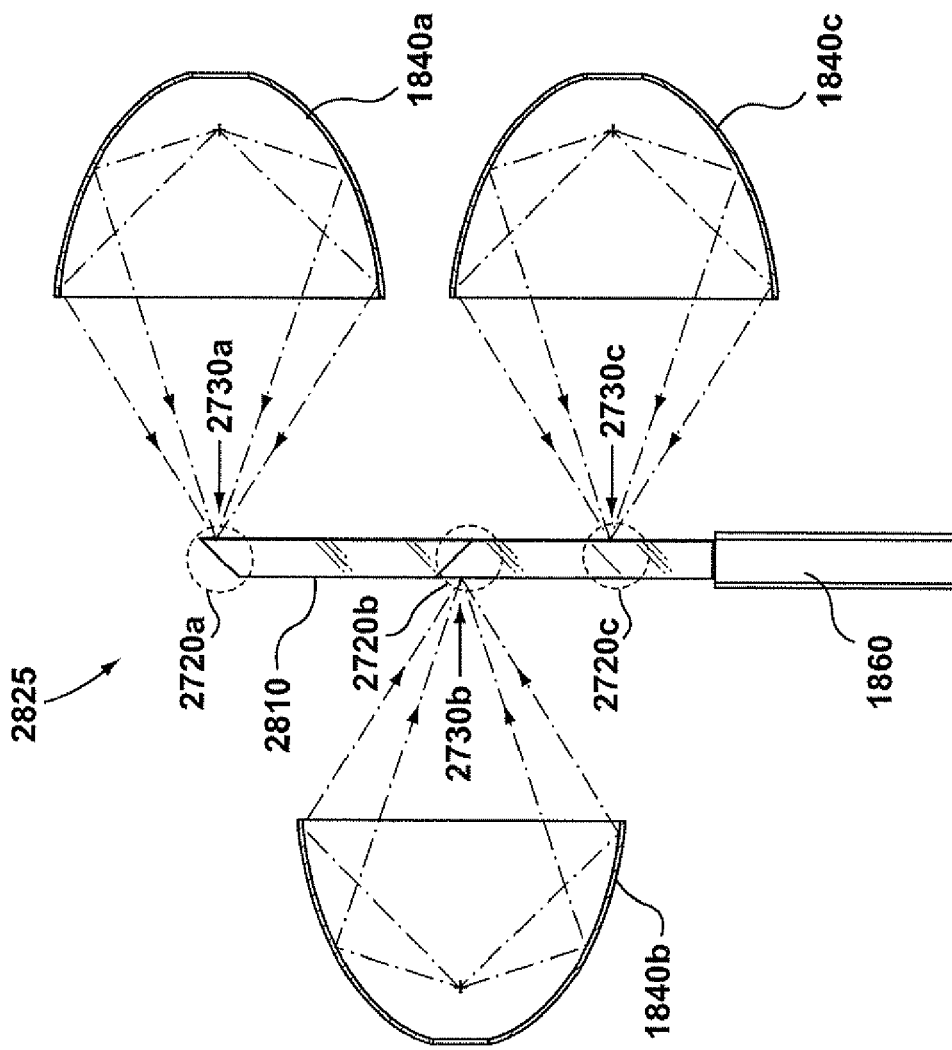
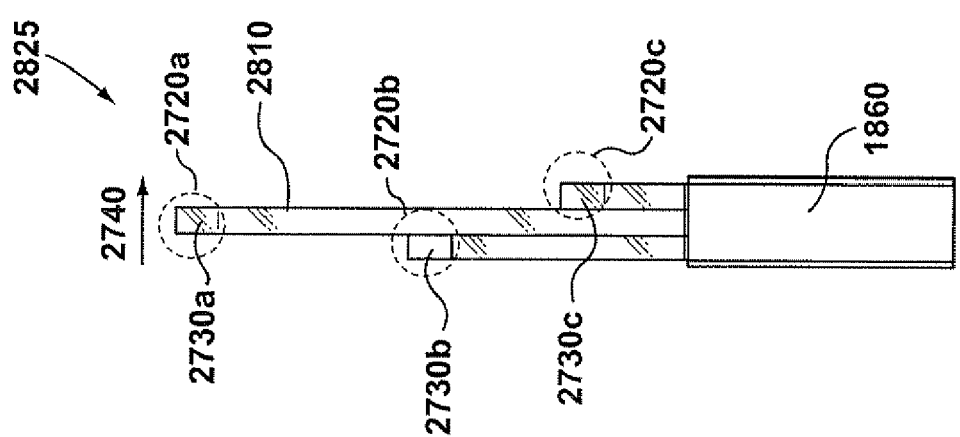

LIGHT INTEGRATOR FOR MORE THAN ONE LAMP

This application claims the benefit of U.S. patent application Ser. No. 12/003,492, filed Dec. 26, 2007 now U.S. Pat. No. 7,712,924, in the U.S. Patent and Trademark Office, the disclosure of which is incorporated herein by reference.

FIELD

The specification relates generally to optical systems, and specifically to a light integrator for more than one lamp.

BACKGROUND

In a projector, for example a digital projector, there are two main optical paths—illumination and projection paths. The illumination path generally comprises a light source such as an elliptical lamp (e.g. an elliptical Hg lamp), an integrator for generating a more uniform beam of light from the light source (i.e. an integrator rod), and illumination relay optics for conveying light from the integrator to the projection path (including the image generation light modulators, such as a digital multi-mirror device (DMD)). The elliptical lamp generally consists of a light source, such as a burner arc, and an elliptical reflector.

However, there is a general problem of mismatch in F-number between the elliptical lamp, the illumination relay optics and the light modulator apparatus. For example, the F-number of commercially available elliptical lamps is generally 0.8 to 1.0, and the F-number of commercially available light modulators is generally about 2.5 (e.g. in a 3-chip projectors Regardless of the F-number chosen for the illumination relay optics, then, light will be lost as it travels from the elliptical lamp to the integrator, and through the illumination relay optics to the light modulator due to the loss in high cone angle light from the low F-number elliptical lamp as it tries to enter the high F-number light modulator.

One approach to this problem has been to match the input F-number of the illumination relay optics to the elliptical lamp, and provide the illumination relay optics with a magnification factor of 2.5/0.8=3.125, such that the output F-number matches the F-number of the light modulator. However, such a large magnification factor requires that the cross section of the integrator be very small, and hence lowers the light collection efficiency of the system due to the overfilling of the large focal spot from the elliptical lamp on the integrator. A partial solution to the problem may be to increase the input F-number of the illumination relay optics such that a larger illumination rod can be used. For example, if the input F-number is 1.3 and the output F-number is 2.5, the magnification factor of the illumination relay optics will be only 1.923 instead of 3.125, as above. However, the F-number of the elliptical lamp remains small, light with high incident angle will be lost due to the F-number mismatch at the input face of the integrator, again reducing the overall light collection efficiency of the system.

Furthermore, optical integrators are well known components used in illumination systems for electronic projectors. An optical integrator is a hollow or solid internally reflective "light pipe" that uses multiple reflections of a focused light source to obtain homogenization of round or irregular patterns of illumination and converts them into a uniform rectangular pattern. This pattern can be imaged onto a panel such as an LCD (Liquid Crystal Display) or DMD (Digital Micromirror Device) by a relay lens system, and then projected to a screen. Thus, the optical integrator rod is used to improve uniformity and efficiently match the aspect ratio of the illumination source to the panel.

There are two basic types of reflective integrators: a hollow pipe which is made of four mirrors, and a solid glass integrator or "solid rod integrator". The latter type is more efficient than the former since it works on lossless multiple reflections using total internal reflection (TIR) of the glass rod. On the other hand, hollow pipe can provide a clean exit surface with manageable suffering from light loss due to the non-perfect reflectivity of the mirrors. Applicant has previously combined both features in U.S. Pat. No. 6,205,271.

It is generally advantageous to provide a two or more lamps in a projector, both to increase brightness and add redundancy in the event one lamp burns out. However, each lamp must be independently coupled to the reflector. This is a particularly difficult problem as while each lamp can be focussed onto the entrance of the integrator, they must then be locally positioned and heat management becomes an issue. This further necessitates an awkward physical arrangement between the lamps making access to them difficult, for example when they burn out. While this problem has been previously addressed in US Patent Application 2007/0058372, to Sacre et al., the integrator disclosed therein is extremely inflexible in design. Furthermore, prior art dual lamp integrators, transmitted 1.40 times single lamp integrators, meaning 0.6 of the light from both of the lamps were lost.

SUMMARY

A first aspect of the specification provides a light integrator comprising a body for integrating light, the body having a length and a light egress end. The light integrator further comprises a first light entrance device for accepting light from a first lamp into the body, and the first light entrance device comprising a first light entrance face, the first light entrance device located distal the light egress end. The light integrator further comprises a second light entrance device for accepting light from a second lamp, and the second light entrance device comprising a second light entrance face, the second light entrance device laterally displaced from the first light entrance device in a direction generally perpendicular to the first light entrance face, such that light from the first and second lamps independently enter the integrator via the first and second light entrance devices respectively, and exit the light egress end, the second light entrance device further displaced from the first light entrance device along the body towards the light egress end, such that each of the first and second lamps may displaced from one another along the body.

The first and second entrance faces can face in the same direction.

The first and second entrance faces can face in opposite directions, such that each of the first and second lamps may be located on opposites sides of the light integrator.

Each of the first and second light entrance devices comprises a prism and the body can comprise at least one of an integrator rod and a hollow tunnel with planar interior mirrored wall surfaces for extending the light egress end to a focal plane which is beyond the light egress end.

The body can comprise a first section extending from the first light entrance device to the light egress end and a second section extending from the second light entrance device to the light egress end, the first section being longer than the second section.

The first section and the second section can be optically coupled together along the length. The first section and the second section can optically coupled together along the length via an optical epoxy.

The first section and the second section can be held together via a mechanical fastener.

At least one of the first and second light entrance devices can comprise a prism, having an entrance plane extending along the body, coinciding with at least one of the first and second light entrance faces, respectively, and an inclined plane opposite the entrance plane, such that light can enter the entrance plane and reflect from the inclined plane towards the light egress end. The inclined plane can form an angle with a light entrance path normal to the entrance plane that is at least a total internal reflection angle, The inclined plane can form an angle with the flat plane of 45°.

The inclined plane can comprise a reflector for reflecting light towards the light egress end. The reflector can comprise at least one of a metal coating, a dielectric coating, a mirror and a cold mirror.

The prism can be integral with the body.

At least one of the first and second light entrance device can comprise a mirror angled to reflect light into a light entrance end of the body, and towards the light egress end, the mirror coincident with the first or second light entrance face respectively.

The light egress end can be enabled for one of abutment to or insertion into an input region of a hollow tunnel with planar interior mirrored wall surfaces for extending the light egress end to a focal plane which is beyond the light egress end.

The light integrator can further comprise at least a third light entrance device for accepting light from a third lamp, and the third light entrance device comprising a third light entrance face, the third light entrance device laterally displaced from the second light entrance device in a direction generally perpendicular to the second light entrance face, such that light from the first, second and third lamps independently enter the integrator via the first, second and third light entrance devices respectively, and exit the light egress end, the third light entrance device further displaced from the first light entrance device along the body towards the light egress end, such that each of the first, second and third lamps may displaced from one another along the body.

The light integrator can further comprise at least a third light entrance device for accepting light from a third lamp into the body, the first light entrance device comprising a third light entrance face, facing in a direction opposite the first light entrance face, the third light entrance device located distal the light egress end and displaced from the first light entrance device in a direction of light from the first lamp incident on the first light entrance device, such that each of the first and third lamps may located on opposite sides of the body.

A fifth aspect of the specification provides a light integration system comprising, a first light integrator. The first light integrator comprises a body for integrating light, the body having a length and a light egress end. The first light integrator further comprises a first light entrance device for accepting light from a first lamp into the body. The first light entrance device comprises a first light entrance face, and the first light entrance device located distal the light egress end. The first light integrator further comprises a second light entrance device for accepting light from a second lamp. The second light entrance device comprises a second light entrance face, the second light entrance device laterally displaced from the first light entrance device in a direction generally perpendicular to the first light entrance face, such that light from the first and second lamps independently enter the integrator via the first and second light entrance devices respectively, and exit the light egress end, the second light entrance device further displaced from the first light entrance device along the body towards the light egress end, such that each of the first and second lamps may displaced from one another along the body. The light integration system further comprises a second light integrator arranged to accepting light from the light egress end. The second light integrator comprises a hollow tunnel with planar interior mirrored wall surfaces for extending the light egress end of the first light integrator to a focal plane which is beyond the light egress end of the first light integrator.

BRIEF DESCRIPTIONS OF THE DRAWINGS

Embodiments are described with reference to the following figures, in which:

FIGS. 18-26 depict integrators according to non-limiting embodiments;

FIGS. 28a, 28b, 29a, 29b, 30 and 31 depict integrators according to non-limiting embodiments.

DETAILED DESCRIPTION OF THE EMBODIMENTS

Figure 1:
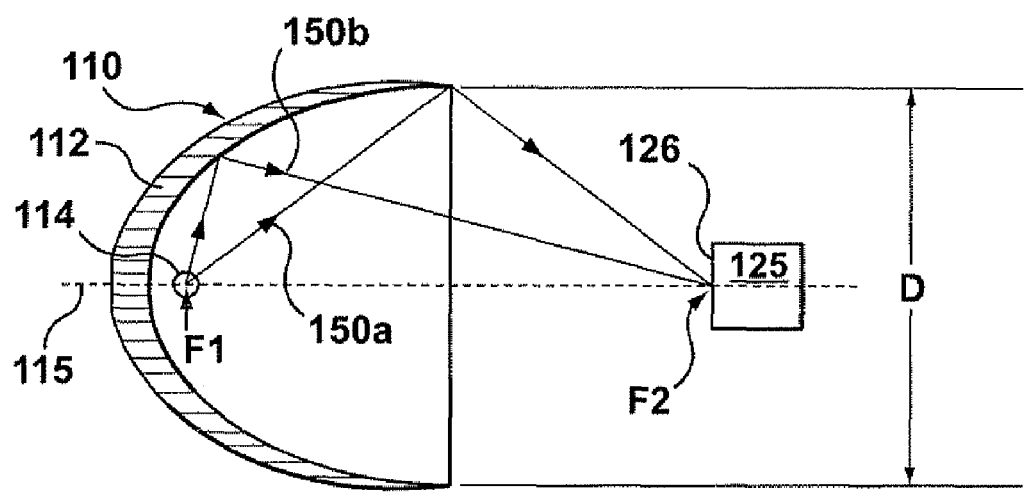
FIG. 1 depicts an optical system for focusing light from an elliptical lamp onto an entrance of an integrator, according to the prior art.

To gain an understanding of embodiments described hereafter, it is useful to first consider FIG. 1, which depicts a system for focusing the light from an elliptical lamp 110 onto an entrance 126 of an integrator 125, according to the prior art. The elliptical lamp 110 and the integrator 125, are axially aligned along a longitudinal axis 115 of the elliptical lamp 110. The elliptical lamp 110 is depicted in cross-section, and is generally symmetrical about the longitudinal axis 115. The integrator 125 is depicted schematically. As known to one of skill in the art, in a projector, the integrator 125 collects the light which impinges on an entrance 126, and channels it to another optical component, for example illumination relay optics (not depicted) and ultimately a light modulator (not depicted), while simultaneously scattering the light internally to create a more uniform beam of light.

The elliptical lamp 110 comprises an elliptical reflector 112, having an aperture of diameter D, and a light source 114. The light source 114 is generally located at a first focal point F1 of the elliptical reflector 114 on the longitudinal axis 115. In some embodiments, the elliptical lamp 110 comprises an elliptical Hg lamp, and hence the light source 114 may comprise a burner arc. However, other types of elliptical lamps are within the scope of present embodiments. As known to one of skill in the art, light rays emitted from the first light source 114, for example lights rays 150a and 150b (collectively light rays 150 and generically light ray 150), that are reflected from the elliptical reflector 112, are focussed at a second focal point F2 of the elliptical reflector 112. Hence, the entrance 126 of the integrator 125 is generally located at F2, while the light source 114 is modeled as a point source in FIG. 2, and subsequent figures, the light source 114 is generally an areal light source and hence overfilling of a large focal spot occurs at the entrance 126 (i.e. an image of the areal light source occurs at the entrance 126).

Figure 5:
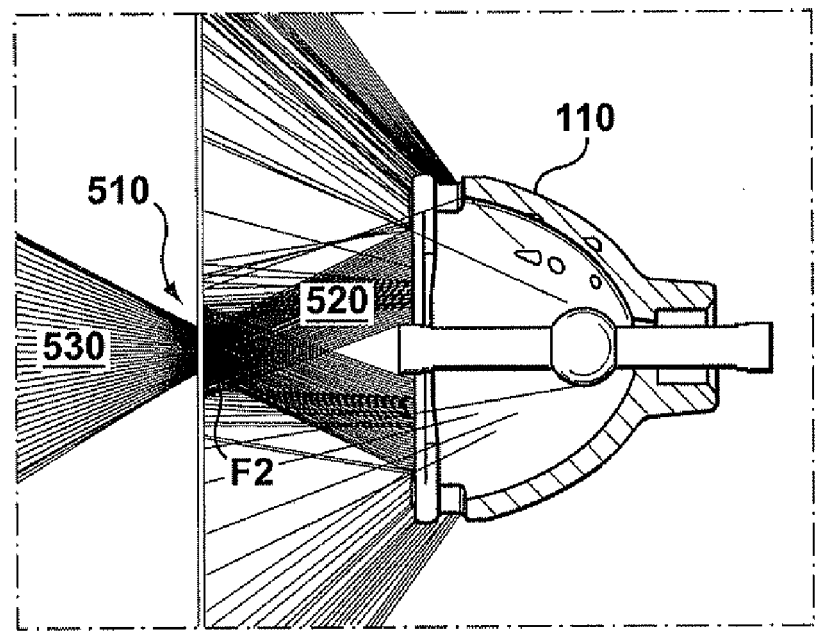
FIG. 5 depicts a ray trace diagram of light emitted from an elliptical lamp in alignment with a rectangular aperture, according to a non-limiting embodiment.
Figure 6:
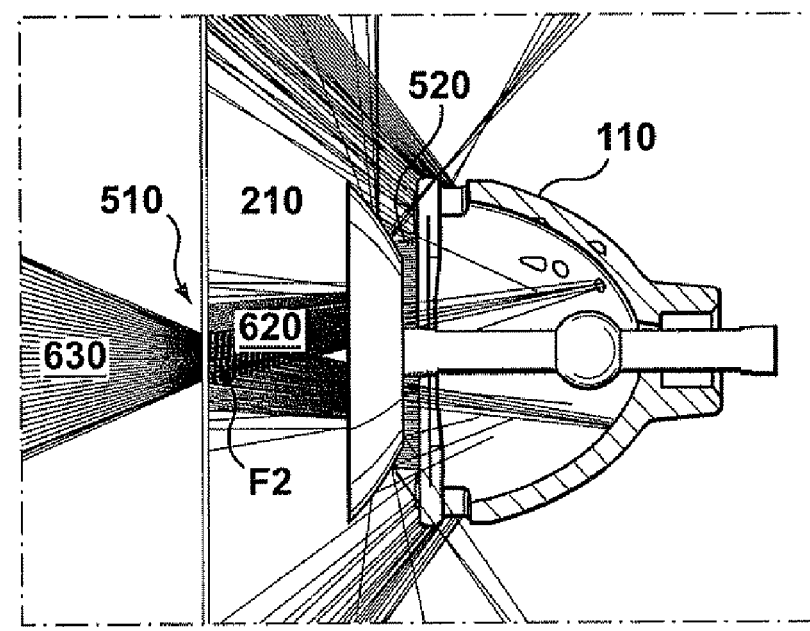
FIG. 6 depicts a ray trace diagram of light emitted from a reflective iris in alignment with an elliptical lamp and a rectangular aperture, according to a non-limiting embodiment.

A person of skill in the art would understand that the light source 114 is generally emitting light in all directions (with the exception of those parts of the light source that comprise the electrical connecting portions of the light source 114 etc., which block portions of the light source 114). A person of skill in the art would further understand that the light ray 150a is emerging from the elliptical lamp 110 at a high cone angle, and that the light ray 150a generally defines a high angle cone which is emerging from the elliptical lamp 110 generally symmetric about the longitudinal axis 115 (as depicted in FIGS. 5 and 6). Similarly, a person of skill in the art would further understand that the light ray 150b is emerging from the elliptical lamp 110 at a low cone angle.

The F-number of the elliptical lamp 110 is defined by the ratio of the focal length F2 to the aperture diameter D, or F2/D, and generally defines the cone angle of the highest angle cone emerging from the elliptical lamp 110, in this example the cone defined by the light ray 150a. It is this high cone angle light that is particularly difficult to capture by the integrator 125, the illumination relay optics and/or the light modulator, Indeed, the high cone angle light has a tendency to scatter outside the receiving optics of the illumination relay optics and/or the light modulator, reducing the overall light collection efficiency of the system, especially if there is a mismatch between the F-number of the elliptical lamp 110 and the illumination relay optics (and/or the light modulator), the F-number of the illumination relay optics being generally larger than the F-number of the elliptical lamp 110. The overfilling of the large focal spot on the entrance 126 further serves to decrease the light collection efficiency of the system.

Figure 2:
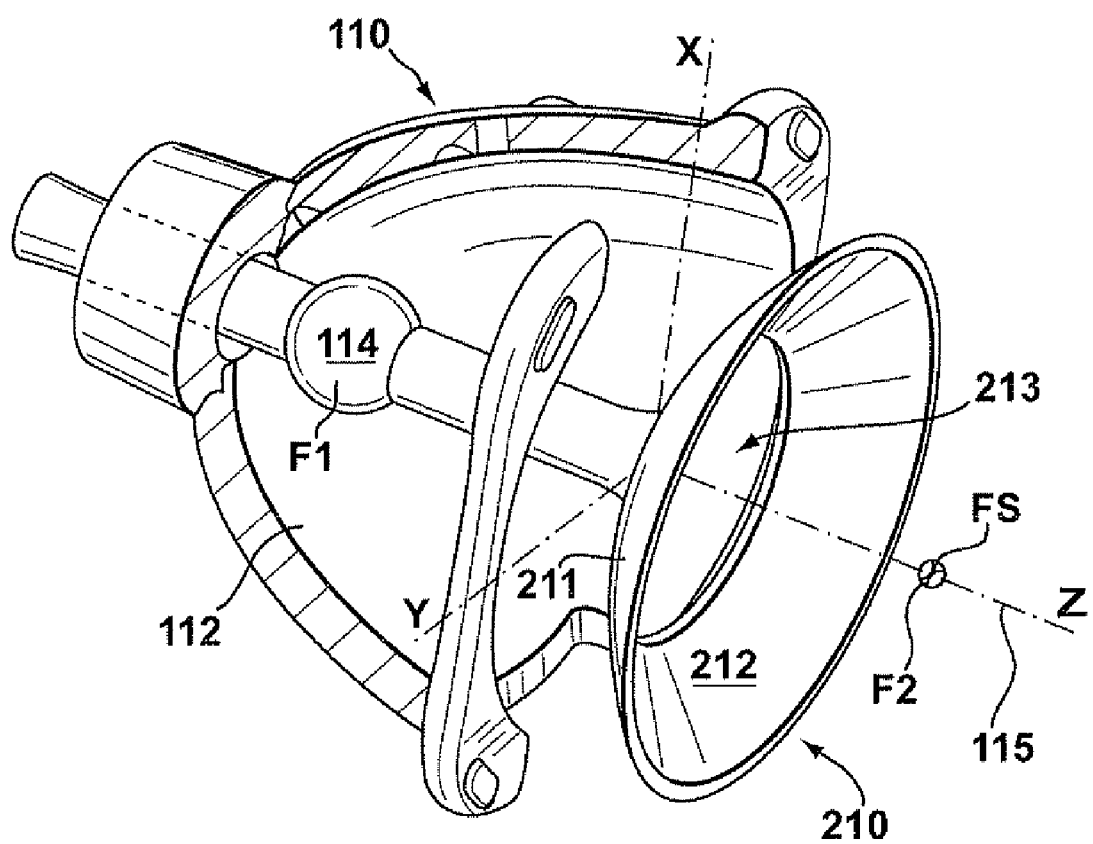
FIG. 2 depicts a perspective view of a reflective iris in alignment with an elliptical lamp, according to a non-limiting embodiment.
Figure 4:
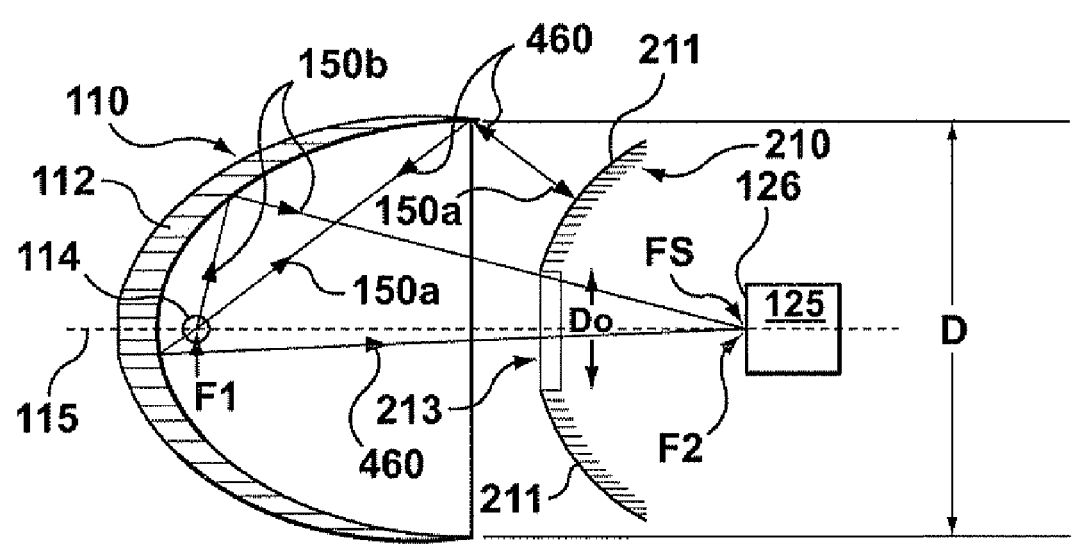
FIG. 4 depicts a cross-section of a reflective iris in alignment with an elliptical lamp, according to a non-limiting embodiment.

Attention is now directed to FIG. 2, which depicts an embodiment of an optical device for adjusting the f-number of an elliptical lamp. Specifically, FIG. 2 depicts a perspective view of a reflective iris 210 for effectively adjusting the F-number of an elliptical lamp, for example the elliptical lamp 110, according to a non-limiting embodiment. In FIG. 2, the elliptical lamp 110 is depicted in a partial cutaway view. The reflective iris 210 comprises a generally spherical convex mirror portion 211 for retro-reflecting a high cone angle portion of a focussed light beam back through the elliptical lamp 110, when the generally spherical convex mirror portion 211 is generally axially aligned with the elliptical lamp 110 along the longitudinal axis 115, and a center FS of the generally spherical convex mirror portion 211 is generally aligned with the focal point F2. The high cone angle portion then emerges from the elliptical lamp at a smaller cone angle after retroflection, as depicted in FIG. 4 and described in detail below. The reflective iris 210 further comprises an optical aperture 213 through said generally spherical convex mirror portion 211, disposed around a longitudinal axis of the generally spherical convex mirror portion 211, for enabling transmission there-through of a lower cone angle portion of the focussed light beam and the retro-reflected high cone angle portion, such that an effective cone angle of the elliptical lamp is smaller than the given cone angle.

The reflective iris 210 further comprises an inner side 212 opposite the generally spherical convex mirror portion 211. While the generally spherical convex mirror portion 211 is both generally reflective and generally spherical, the properties of the inner side 212 are generally non-limiting as long as the inner side 212 does not interfere with the reflection of the focussed light beam back through the elliptical lamp 110, and the transmission of the lower cone angle portion of the focussed light beam and the retro-reflected high cone angle portion through the optical aperture 213. Indeed while the reflective iris 210 is generally depicted a shell of a spherical portion in FIG. 2 and subsequent figures, in other embodiments, the reflective iris 210 may be a solid spherical portion with the optical aperture 213 being a shape suitable for enabling transmission there-through of the lower cone angle portion of the focussed light beam and the retro-reflected high cone angle portion.

While the optical aperture 213 is depicted as circular, the shape of the optical aperture 213 is not particularly limiting. Indeed, the shape of the optical aperture 213 may depend on the application. For example, if the elliptical lamp 110 and the reflective iris 210 are to be used in a projector with a rectangular integrator, the optical aperture 213 may be rectangular, and of the same aspect ratio as the integrator and/or the light modulator.

Moreover, while the reflective iris 210 is also depicted as generally circular, the shape of the reflective iris 210 is generally limited only by the shape of the elliptical lamp 110. For example, if the elliptical reflector 112 is not generally circular, but has been designed to provide generally elliptical areas that intersect at an angle to form a unified body, the generally spherical convex mirror portion 211 may reflect the shape of the resulting elliptical lamp, being comprised of generally convex mirror sections that intersect at an angle to form a unified generally spherical reflecting surface.

Figure 3:
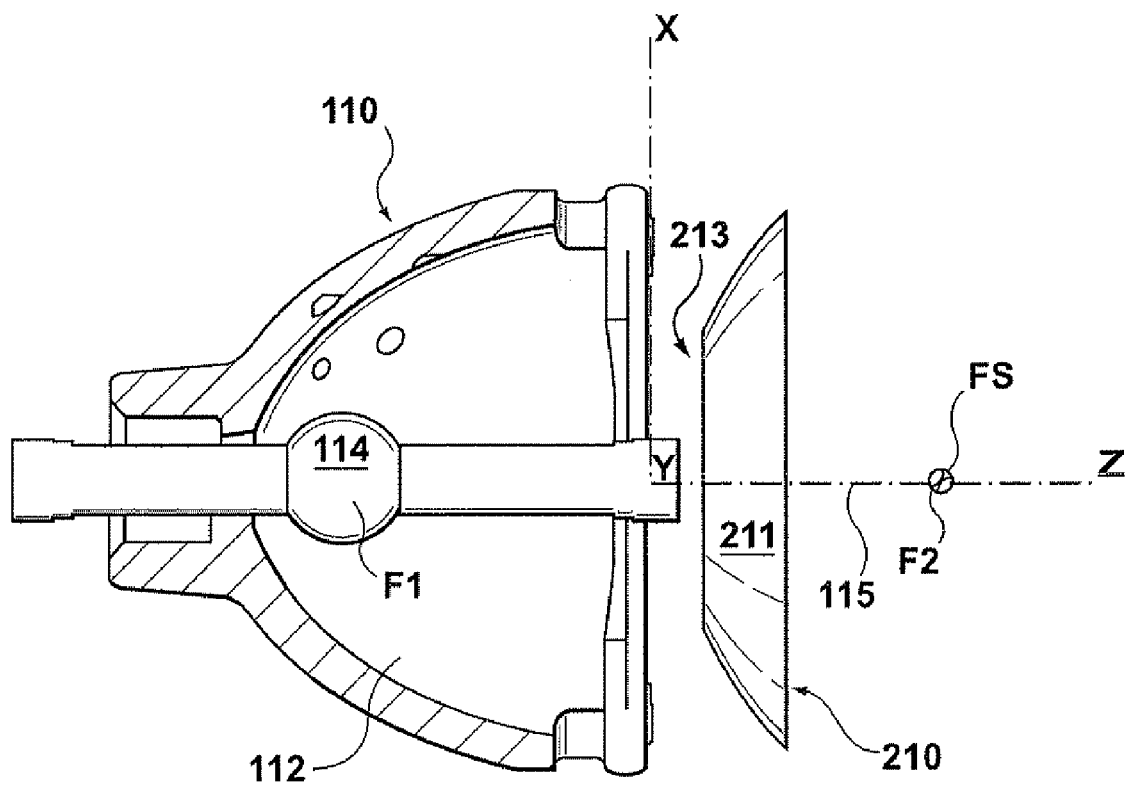
FIG. 3 depicts a side view of a reflective iris in alignment with an elliptical lamp, according to a non-limiting embodiment.

FIG. 3 depicts a side view of the elliptical lamp 110 and the reflective iris 210 in general alignment, with the elliptical lamp 110 depicted in cross-section, according to a non-limiting embodiment, FIG. 4 depicts a schematic of the reflective iris 210 and the elliptical lamp 110 in general alignment, with the elliptical lamp 110 depicted in cross-section, according to a non-limiting embodiment, as in FIG. 1, with like numbers depicting like elements. The generally spherical convex mirror portion 211 is depicted schematically, while the optical aperture 213 is depicted in cross-section. The optical aperture 213 is further depicted having a diameter of Do, with Do being less than the diameter D of the aperture of the elliptical reflector 112. FIG. 4 further depicts the integrator 125 in axial alignment with both the reflective iris 211 and the elliptical lamp 110.

FIG. 4 further depicts the light ray 150a impinging on the generally spherical convex mirror portion 211. Due to the spherical nature of the generally spherical convex mirror portion 211, and the general axial alignment of the elliptical reflector 112 and the reflective iris 210, the light ray 150a impinges on the generally spherical convex mirror portion 211 generally normally (i.e. generally at a right angle). Hence a reflected light ray 460 travels directly back along the same path as the light ray 150a, passing generally back through the light source 114 to again reflect from the elliptical reflector 112. However, as the light ray 460 is now travelling at an angle which is 180° to the light ray 150a, when it again reflects from the elliptical reflector 112, the light ray 460 emerges from the elliptical lamp 110 at a smaller cone angle than light ray 150b. Hence, the light ray 460 passes through the optical aperture 213 and enters the integrator 125 at the smaller cone angle.

In contrast, the light ray 150b passes through the optical aperture 213 after being reflected from the elliptical reflector 112. As depicted, the light ray 150b comprises the largest angle light ray emitted from the elliptical lamp 110 that is not reflected by the generally spherical convex mirror portion 211. Light rays which emerge from the elliptical lamp 110 having a cone angle greater than that of the light ray 150b, are retro-reflected back through the elliptical reflector 112 by the generally spherical convex mirror portion 211. The overall result is that, when the reflective iris 210 is generally axially aligned with the elliptical lamp 110, and the center FS of the reflective iris 210 is generally aligned with the second focal point F2, the F-number of the elliptical lamp 110 is effectively adjusted from F2/D to FS/Do, with the specific F-number being defined by the diameter Do and the center FS of the reflective iris 210.

Hence, the reflective iris 210 may be enabled for effectively adjusting the F-number of the elliptical lamp 110 to a different F-number for better compatibility with the integrator 125, the illumination relay optics and/or the light modulator of a projector system, increasing the overall light collection efficiency of the system, by choosing a suitable diameter Do and a suitable center FS of the reflective iris 210.

The reflective iris 210 is generally comprised of a suitable material or combination of materials to enable the retroreflection as described and is generally heat resistant: when the reflective iris 210 is aligned with the elliptical lamp 110, the reflective iris 210 is in proximity to the elliptical lamp 110 which can get hot in operation (for example an elliptical Hg lamp). Hence, the reflective iris 210 is comprised of a material, or combination of materials, which can withstand the heat of the elliptical lamp 110, and further the generally spherical convex mirror portion 211 is comprised of a suitable generally reflective material, or combination of materials for reflecting light emitted from the elliptical lamp 110.

In some non-limiting embodiments, the reflective iris 210 may comprise a suitable metal of a suitable shape, with the generally spherical convex mirror portion 211 being generally reflective of light emitted from the elliptical lamp 110. For example, the reflective iris 210 may comprises aluminum, with the generally spherical convex mirror portion 211 being polished, treated and/or coated to reflect light emitted from the elliptical lamp 110. In these embodiments, the optical aperture 213 may comprise an opening in the metal.

In another non-limiting embodiment, the reflective iris 210 may comprise a substrate material of a suitable shape, while the generally spherical convex mirror portion 211 may comprise a coating on the substrate material. In a non-limiting example, the substrate material may comprise a suitable transparent material, for example a high temperature glass (e.g., Vycor™, Pyrex™, N-BK7, fused silica and the like), of a suitable shape, and the generally spherical convex mirror portion 211 may comprise a suitable generally reflective coating on the glass, such as a thin film metal or a dielectric coating. Further, in some embodiments, if the glass is itself a generally spherical portion, the coating may be on the outside of the glass or on the inside of the glass (i.e. deposited on the inner side 212). In some of these embodiments, the optical aperture 213 may comprise an opening in the substrate material. In embodiments where the reflective iris 210 is comprised of a suitable transparent material and the generally spherical convex mirror portion 211 comprises a suitable generally reflective coating, the optical aperture 213 may comprise an opening in the generally reflective coating (i.e. an area of the reflective iris 210 that was not coated with the generally reflective coating). In these embodiments, the suitably transparent material may further comprise an optical filter for filtering unwanted light, for example UV light and/or infrared light. The optical filter may comprise an optical coating on the suitable transparent material, on any suitable side or area. Alternatively, the suitable transparent material may comprise inherent light filtering properties (e.g. a glass which absorbs UV light).

The outer dimensions of the reflective iris 210 are generally configured so that the reflective iris 210 retro-reflects light rays emitted from the elliptical lamp 110 that have the highest angle cone, for example the light ray 150a. Further, the outer dimensions of the reflective iris 210 are generally configured so as to not interfere with the impingement of the light that is transmitted through the optical aperture 213 on the integrator 125.

It will be recalled that the reflective iris 210 may be enabled for effectively adjusting the F-number of the elliptical lamp 110 to a specific F-number for better compatibility with the integrator 125, the illumination relay optics and/or the light modulator of a projector, to increase the overall light collection efficiency of the system. Moreover, the F-number of the elliptical lamp 110 can be effectively and freely adjusted by choosing a suitable Do of the optical aperture 213 for each application, and a suitable center FS. In addition, since the cone angle of the focussed light beam that enters the integrator 125 is narrower (i.e. due to the larger F-number) with the reflective iris 210 in alignment (i.e. in FIG. 4 vs. FIG. 1), the contrast ratio of a projector using the reflective iris 210 will improve due to reduced light overlapping between an on-state and off-state light path from the light modulator (e.g. a Digital Micromirror Device or DMD).

In a non-limiting example, the F-number of the elliptical lamp 110 may be adjusted to match the input F-number of the illumination relay optics. In particular non-limiting embodiment, the input F-number is 1.3 and the F-number of the elliptical lamp 110 is 0.8. Hence, the reflective iris 210 may be configured to effectively adjust the F-number of the elliptical lamp 110 to 1.3 by choosing a suitable Do and a suitable center FS. By doing this, the light throughput increases resulting in a higher brightness of the projector. As well, the use of the reflective iris 210 improves the use of an input F-number for the illumination relay optics that is intermediate the elliptical lamp 110 and the light modulator, as the light collection efficiency at the integrator 125 is increased.

In order to demonstrate the performance of the reflective iris 110, two non-limiting models were created. FIG. 5 depicts a ray diagram of a model of the system depicted in FIG. 1, with the elliptical lamp 110 in alignment with a rectangular aperture 510 representing the entrance 126 of integrator 125, but without the reflective iris 210. FIG. 6 depicts a ray diagram of a model of the system depicted in FIG. 4, similar to that of FIG. 5 but with the reflective iris 210. In each figure, the light source 114 of FIGS. 1 and 4 is modeled as an areal light source rather than as a point light source.

In each model, the F-number of the elliptical lamp 110 is 0.8, while the rectangular aperture 510 has dimensions of 6.8×5.85 mm with a collection F-number of 1.3, and is located at the second focus F2 of the elliptical lamp 110. In FIG. 6, the diameter Do of the optical aperture 213 is 24 mm.

FIG. 5 further depicts a focussed cone of light 520 as it emerges from the elliptical lamp 110, and a cone of light 530 that emerges from the rectangular aperture 510, as the focussed cone of light 520 impinges on the rectangular aperture 510. In contrast, FIG. 6 also depicts the focussed cone of light 520 as it emerges from the elliptical lamp 110, but FIG. 6 further depicts that with the reflective iris 210 in alignment, a high cone angle portion of the focussed cone of light 520 is retro-reflected back through the elliptical lamp 110 and through the reflective iris 210. The result is that a focussed cone of light 620 that emerges from the reflective iris 210 (in combination with the elliptical lamp 110) has a smaller cone angle than the focussed cone of light 520 that emerges from the elliptical lamp 110. As the focussed cone of light 620 impinges on the rectangular aperture 510, a cone of light 630 that emerges from the rectangular aperture 510, has a smaller cone angle than the cone of light 530 that emerges from the rectangular aperture 510 in the system of FIG. 5.

Table 1 further records the gain in light collection efficiency between the system depicted in FIG. 6 and the system depicted in FIG. 5 using ray-tracing illumination software such as TracePro from Lambda Research Corporation, 25 Porter Rd, Littleton, Mass. 01460-1434, USA. Light emitted from the elliptical lamp 110 was modeled as 21928 lumens. Light emitted through the rectangular aperture 510 without the reflective iris 110 in alignment (as in FIG. 5) was then determined to be 12937 lumens, while light emitted through the rectangular aperture 510 with the reflective iris 210 in alignent (as in FIG. 6) was determined to be 13957 lumens. In other words, with the reflective iris 210 in alignment, as in FIG. 6, an increase in light collection efficiency of 8% was achieved,

TABLE 1

| Total from Lamp = 21928 lm | | | |
|---|---|---|---|
| | With Iris (lm) | Without Iris (lm) | Improvement |
| Light through Rectangular Aperture | 13957 | 12937 | 8% |
| Light Collection Efficiency | (63.7%) | (59.0%) | |

Figure 7:
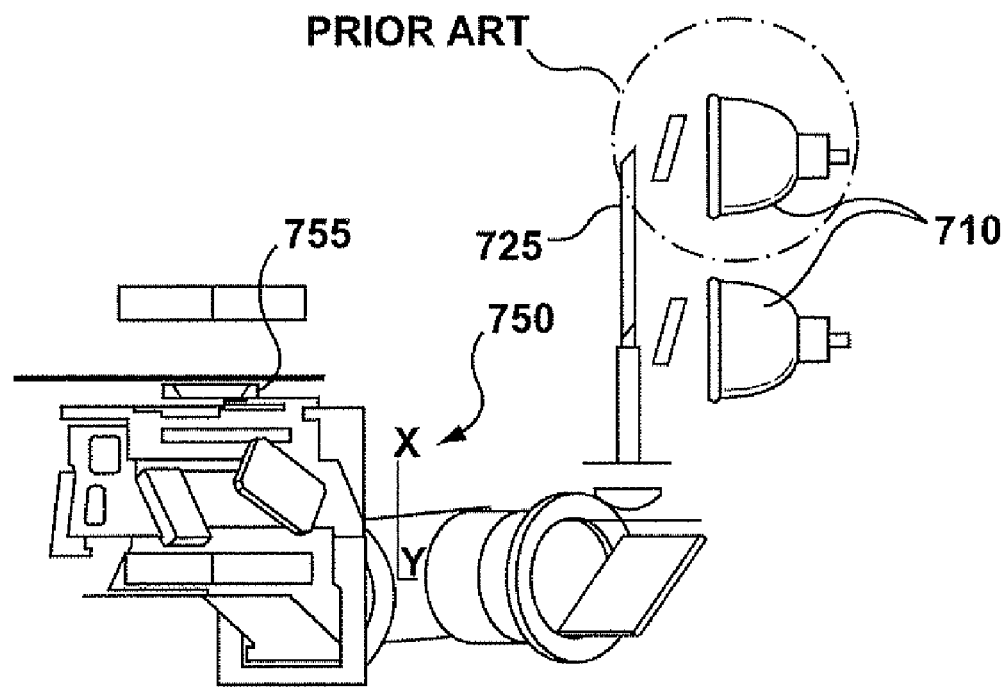
FIG. 7 depicts a projector comprising at least one lamp arranged onto an entrance face of an integrator, the arrangement according to the prior art, and the integrator according to a non-limiting embodiment.
Figure 8:
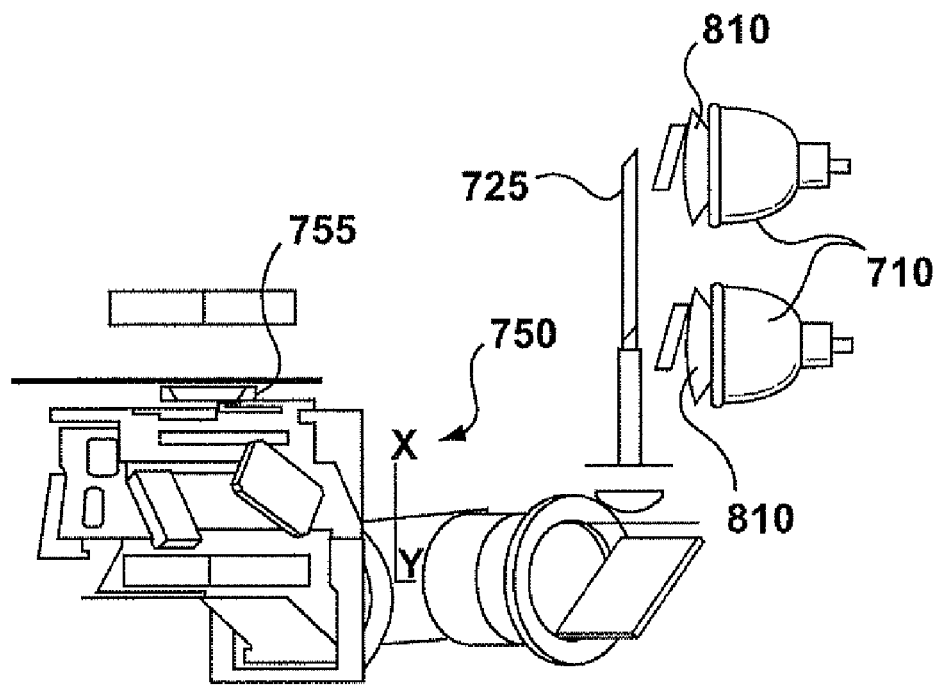
FIG. 8 depicts a projector, according to a non-limiting embodiment.

FIG. 7 depicts a schematic of a light collection system of a projector comprising two elliptical lamps 710, similar to the elliptical lamp 110, focussed on two entrances of an integrator 725, the body of the integrator 725 performing substantially the same function in substantially the same way as the integrator rod 125. The integrator 725 channels light from each of the elliptical lamps 710 perpendicular to the light output path of each of the elliptical lamps 710 to illumination relay optics 750, which subsequently magnifies and channels the light to a light modulator 755. The integrator 725 will be described in further detail below, with reference to FIGS. 18-21, 23 and 24. The arrangement between each of the elliptical lamps 710 and each corresponding entrance to the integrator 725 is generally according to the prior art. In contrast, FIG. 8 shows how reflective irises 810, similar to the reflective iris 210, can be incorporated into the system of FIG. 7 between each elliptical lamp 710 and each corresponding entrance to the integrator 725 to improve the light collection efficiency of the projector.

Figure 9:
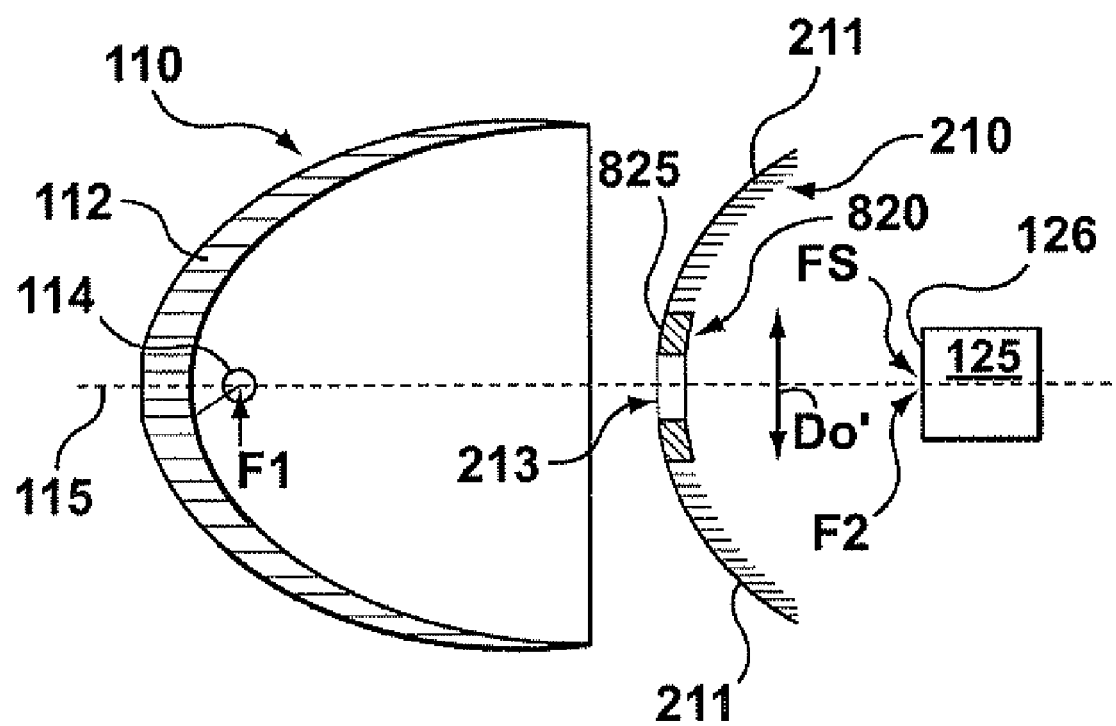
FIG. 9 depicts a cross-section of a reflective iris having a variable optical aperture, in alignment with an elliptical lamp, according to a non-limiting embodiment.

Attention is now directed to FIG. 9 is substantially similar to FIG. 4, with like elements depicted with like numbers, however the light rays 150 have been omitted for simplicity. FIG. 9 depicts another non-limiting embodiment of the reflective iris 210, in which the reflective iris 210 further comprises an apparatus 820 for varying the diameter of the optical aperture 213. Hence, in this embodiment, the optical aperture 213 has a variable diameter Do'. In some embodiments the apparatus 820 resides within the optical aperture 213 (as depicted). In other embodiments, the apparatus 820 may be mounted on the lamp side of the reflective iris 210, while in yet other embodiments, the apparatus 820 may be mounted on the integrator side of the reflective iris 210. In yet other embodiments, the apparatus 820 may be a separate element from the reflective iris 210 and be mounted either between the reflective iris 210 and the integrator 125, or between the reflective iris 210 and the elliptical lamp 110.

In some embodiments, the apparatus 820 is a generally spherical portion (as depicted), with a radius and center that is generally similar to the radius and center FS, respectively, of the reflective iris 210. In some of these embodiments, an elliptical lamp side surface 825 is generally reflective and retro-reflects light back towards the elliptical lamp 110 in a manner similar to the generally spherical convex mirror portion 211.

In other embodiments, the apparatus 820 may be generally planar.

In some embodiments, the apparatus 820 may also generally comprise a device for a user of the system of FIG. 8 to adjust the variable diameter Do'. In some embodiments, a lamp-facing surface of the apparatus 820 is reflective. In some non-limiting embodiments, the apparatus 820 comprises an iris diaphragm. In some of these embodiments, the iris diaphragm is a generally spherical portion.

By varying the variable diameter Do' of the optical aperture 213, the F-number of the system of FIG. 8, may be varied according to F=F2/Do'. Hence, a smaller Do' aperture will lead to a larger F-number. This has the effect of tightening the cone angle of the light impinging on the entrance 126, which results in a better contrast ratio for the optical components towards which the integrator 125 channels the light toward, such as a light modulator (e.g. a (DMD).

In one non-limiting example, the systems of FIGS. 2, 3, 4, 6 and 9 comprise light production systems for an optical projector. In some of these embodiments, the optical projector comprises an analog optical projector, while in other embodiments, the optical projector comprises a digital optical projector, for example a digital optical projector as manufactured by Christie Digital Systems Canada, Inc., 809 Wellington St. N., Kitchener, Ontario, Canada N2G 4Y7.

In some embodiments the reflective iris 210 may be adapted for mounting between the elliptical lamp 110 and the integrator 125. In other embodiments, the reflective iris 210 may be adapted for mounting to the elliptical lamp 110, for example by gluing the reflective iris 640 to the aperture of the elliptical lamp 110 In some of these embodiments, a suitable spacer may be provided to protect the reflective iris 210 from the heat of the elliptical lamp 110, and to ensure a suitable optical path of the light rays 150.

Figure 10:
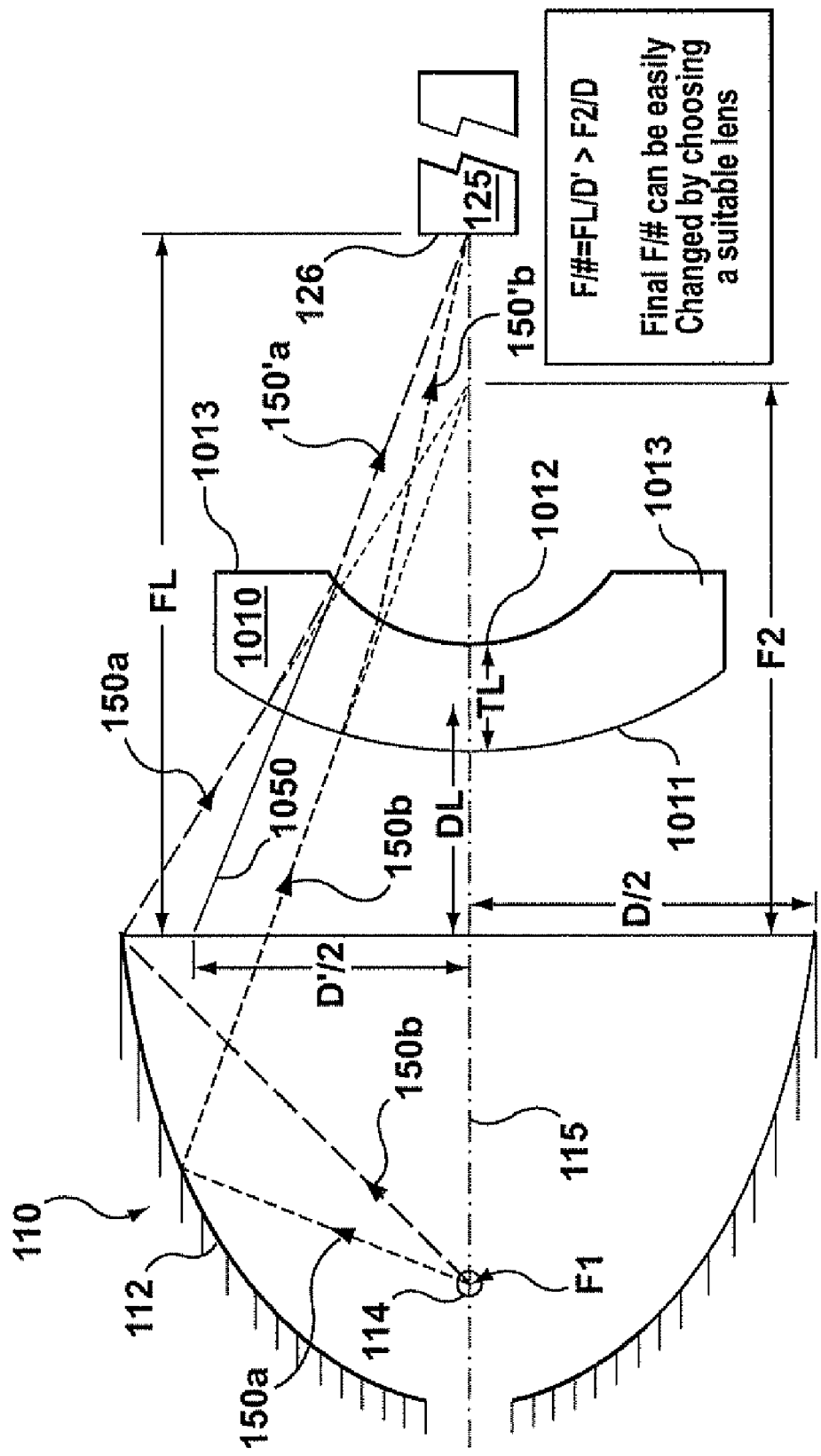
FIG. 10 depicts a cross section of a lens for effectively adjusting the F-number of an elliptical lamp, in alignment with the elliptical lamp, according to a non-limiting embodiment.

Turning now to FIG. 10, an alternative embodiment of an optical device for adjusting the F-number of an elliptical lamp is depicted. FIG. 10 depicts the elliptical lamp 110 and the integrator of FIG. 1 in schematic, along with light rays 150, with like elements depicted with like numbers. FIG. 10 further depicts an F-Number Lens (FNL) 1010 recovering the loss of a high-angle portion of the focussed light beam emerging from the elliptical lamp 110. In essence, when the FNL 1010 is axially aligned with the elliptical lamp 1010, with an elliptical lamp side surface 1011 facing the elliptical lamp 110, the FNL 110 refracts, diverges and focuses the focussed light beam emerging from the elliptical lamp 110 onto the entrance 126 of the integrator. Hence, the F-number of the elliptical lamp 110 can effectively be adjusted (e.g., from 0.8 to 1.3, as above) to match the input F-number of an illumination relay system in a projector. By doing this, the light collection efficiency will be increased which will result in a higher brightness of the projector.

The FNL 1010 generally comprises a meniscus or concave comprising a lamp side surface 1011 having a radius of curvature R1, and an integrator side surface 1012 having a radius of curvature R2. In the depicted embodiment, R2 is less than R1, and hence the FNL 1010 further comprises corners 1013 to connect the lamp side surface 1011 and the integrator side surface 1012. However, present embodiments are not particularly limited by the corners 1013 and the lamp side surface 1011 and the integrator side surface 1012 may be connected by any suitable structure. Moreover the FNL 1010 has a thickness TL.

Further, a reference point on the FNL 1010 is located at a position DL relative to the aperture of the elliptical lamp 110. In some embodiments the reference point on the FNL 1010 is located at the center of the FNL 1010 (as depicted), however the reference point may be located at any suitable point on the FNL 1010, for example on the lamp side surface 1011 or the integrator side surface 1012.

The FNL 1010 may comprise any suitable optical material or combination of materials. In general the FNL 1010 should be enabled to tolerate the heat generated from the elliptical lamp 110. Non-limiting examples of suitable optical materials include but are not limited to fused silica, N-BK7, Vycor™, and Pyrex™. In some embodiments, for higher light transmission, N-BK7 may be used as long as the design of the system allows the N-BK7 to tolerate the heat generated from the elliptical lamp 110. In some embodiments, the surface of the lens side surface 1011 may be coated with a UV coating to block transmission of UV light from through the FNL 1010. This obviates the need for a separate UV filter in the system. In some embodiments, the surface of the integrator side surface 1012 and/or the surface of the lamp side surface 1011, can be coated with multi-layer anti-reflection coating to increase transmission through the FNL 1010.

Indeed, given the F-number of the elliptical lamp 110, and the desired effective F-number of the elliptical lamp, the relationships between the behaviour of the system of FIG. 10 and parameters such as DL, TL, R1, R2, may be determined using optical design software such as ZEMAX® (from ZEMAX Development Corporation, 3001 112th Avenue NE, Suite 202, Bellevue, Wash. 98004-8017 USA), CODE V® (from Optical Research Associates, 3280 East Foothill Boulevard, Suite 300 Pasadena, Calif. 91107-3103), OSLO® (from Lambda Research Corporation, 25 Porter Rd, Littleton, Mass. 01460-1434 USA), and the like. Using such optical design software, DL, R1 and R2 and TL of the FNL 1010 may be determined, using as inputs the F-number of the elliptical lamp 110 and the desired effective F-number of the elliptical lamp 110 with the FNL 1010 in alignment with the elliptical lamp 110, as well as the distance between the entrance 126 and the elliptical lamp 110. Further, limits can be placed on some or all of the parameters. DL, for example, may be limited to a minimum distance that the FNL 1010 should be from the elliptical lamp 110 to prevent heat damage. Further DL, TL, R1 and R2 may be limited to reflect space considerations in the system. For example, there may be a preferred maximum distance between the entrance 126 and the FNL 1010 and or a preferred maximum distance between the entrance 126 and the elliptical lamp 110. With such inputs, the optical software may freely design the system depicted in FIG. 10. The FNL 1010 can then be manufactured as required.

In some embodiments, R1 of the lamp side surface 1011 is generally chosen so that the focussed beam of light that emerges from the elliptical lamp 110 impinges on the lamp side surface 1011 at a normal or near normal angle, as depicted, such that the refraction of the focussed light beam generally occurs at the integrator side surface 1012.

Further examination of FIG. 10 shows that, in the depicted embodiment, the entrance 126 is not located at the second focal point F2 of the elliptical lamp 110. Rather, the entrance is located at the focal point of the FNL 1010, which is depicted as a distance FL from the elliptical lamp 110. From the point of view of the entrance 126, the distance FL is the effective focal length of the elliptical lamp 110. Note that in FIG. 10, the second focal length F2 is represented as the distance F2 from the elliptical lamp 110 along the longitudinal axis 115.

Furthermore, FIG. 10 depicts the light ray 150a and the light ray 150b from FIG. 1. As in FIG. 1, the light ray 150b represents a low cone angle light ray while the light ray 150a represents the highest cone angle light ray that emerges from the elliptical lamp 110. In this embodiment, however, each light ray is refracted, diverged and focused by the FNL 110. Indeed, FIG. 10 depicts two paths for each light ray 150, the path of the light ray 150 in the absence of the FNL 1010 (broken line) and the path of the light ray 150a in the presence of the FNL 1010 (solid line). For example, in the absence of the FNL 1010, each light ray 150 would be focussed onto the second focal point F2 (at the intersection of broken lines, as depicted). In the presence of the FNL 1010, a refracted portion of each light ray 150 is focussed onto the entrance 126, at the distance FL from the elliptical lamp 110. The light ray 150a comprises a refracted portion 150'a, and the light ray 150b a refracted portion 150'b.

Figure 13:
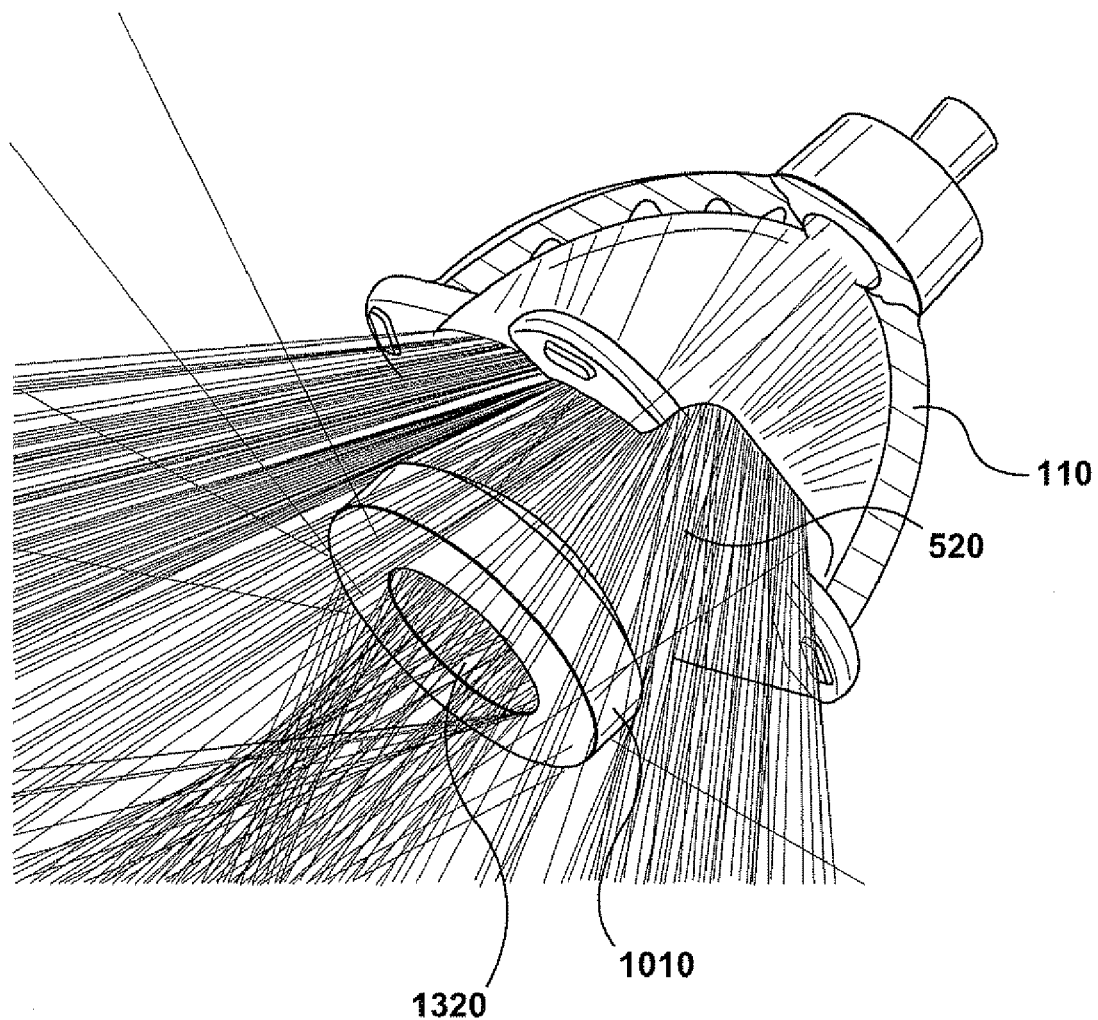
FIG. 13 depicts a ray trace diagram of light emitted from a lens for effectively adjusting the F-number of an elliptical lamp, in alignment with an elliptical lamp, according to a non-limiting embodiment.

The refracted portion 150' a represents the highest cone angle light ray emerging from the FNL 1010, as the light ray 150a represent the highest cone angle light ray impinging on the lamp side surface 1011 of the FNL 1010. Furthermore, it is understood that the refracted portion 150' a generally defines a high angle cone which is emerging from the FNL 1010 and which is generally symmetric about the longitudinal axis 115 (as depicted in FIG. 13). However, if a path 1050 of the refracted portion 150'a is directly traced back towards the elliptical lamp 110, the intersection of the path 1050 and the aperture of the elliptical lamp 110 defines a distance D'/2 from the longitudinal axis 115. Again turning to the point of view of the entrance 126 the cone defined by the refracted portion 150'a effectively appears to emerge from the elliptical lamp 110, but the aperture of the elliptical lamp 110 effectively appears to have a diameter D', rather than D. Hence, the effective F-number of the elliptical lamp 110/FNL 110 system is FL/D'.

Hence, the FNL 1010 may be enabled for effectively adjusting the F-number of the elliptical lamp 110 from F2/D to FL/D' for better compatibility with the integrator 125, the illumination relay optics and/or the light modulator in a projector system, increasing the overall light collection efficiency of the system. Moreover, the F-number of the elliptical lamp 110 can be effectively and freely adjusted by choosing a suitable FNL, similar to the FNL 1010, for each application. In addition, since the cone angle of the focussed light beam that enters the integrator 125 is narrower (i.e. due to the larger F-number) with the FNL 1010 in alignment (i.e. in FIG. 4 vs. FIG. 1), the contrast ratio of a projector using the FNL 1010 will improve due to reduced light overlapping between an on-state and off-state light path from the light modulator (e.g. a Digital Micromirror Device or DMD).

In a non-limiting example, the F-number of the elliptical lamp 110 may be adjusted to match the input F-number of the illumination relay optics. In particular non-limiting embodiment, the input F-number is 1.3 and the F-number of the elliptical lamp 110 is 0.8. Hence, the FNL 1010 may be configured to effectively adjust the F-number of the elliptical lamp 110 to 1.3 by choosing a suitable R1, R2 and a suitable FL. By doing this, the light throughput increases resulting in a higher brightness of the projector. As well, the use of the FNL 1010 improves the use of an input F-number for the illumination relay optics that is intermediate the elliptical lamp 110 and the light modulator, as the light collection efficiency at the integrator 125 is increased.

Figure 11:
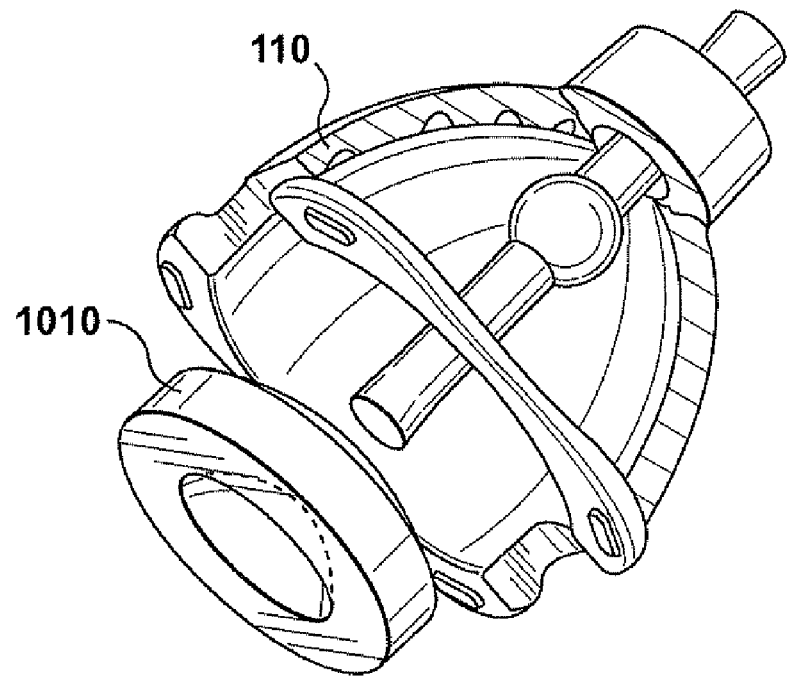
FIG. 11 depicts a perspective view of a lens for effectively adjusting the F-number of an elliptical lamp, in alignment with an elliptical lamp, according to a non-limiting embodiment.

Attention is now directed to FIG. 11, which depicts a perspective view of the FNL 1010 and the elliptical lamp in general alignent, according to a non-limiting embodiment. In FIG. 11, the elliptical lamp 110 is depicted in a partial cut-away view.

Figure 12:
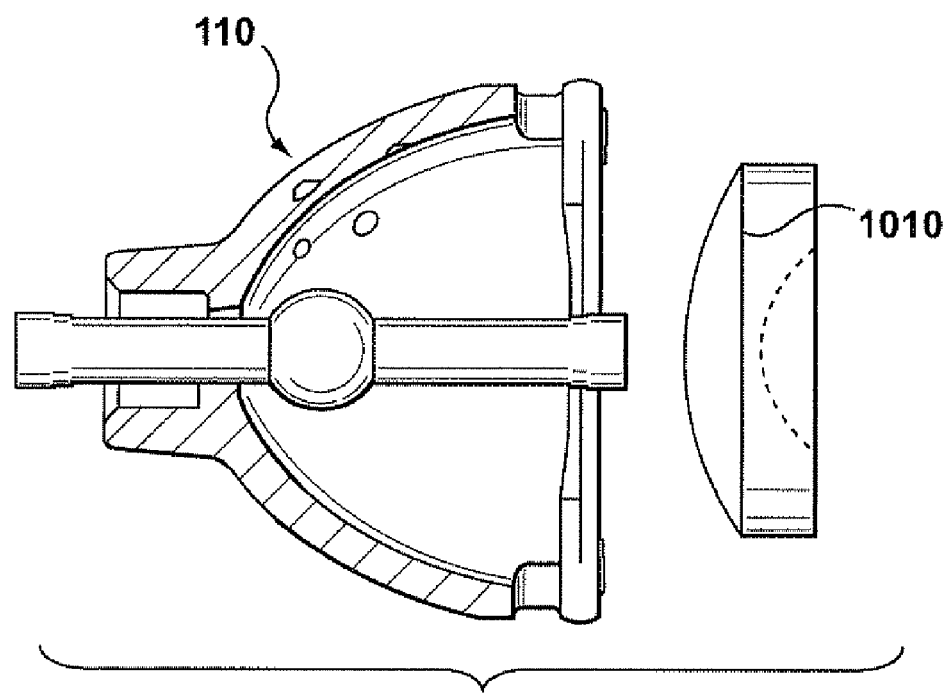
FIG. 12 depicts a side view of a lens for effectively adjusting the F-number of an elliptical lamp, in alignment with an elliptical lamp, according to a non-limiting embodiment.

FIG. 12 depicts a perspective side view of the FNL 1010 and the elliptical lamp 110 in general alignment, with the elliptical lamp 110 depicted in cross-section, according to a non-limiting embodiment.

In order to demonstrate the performance of the FNL 1010, two non-limiting models are created. The first model is similar to the model depicted in FIG. 5, with the elliptical lamp 110 in alignment with the rectangular aperture 510 representing the entrance 126 of integrator 125, but without the FNL 1010. However in this model, a UV filter is placed in front of the elliptical lamp 110 in order to reject UV from the elliptical lamp 110. FIG. 13 depicts a perspective view of a ray diagram of the elliptical lamp 110 in alignment with the FNL 1010.

The second model is similar to FIG. 13, with the rectangular aperture 510 at the focal point. Compared to the first model, the FNL 1010 replaces the UV filter in each model, the light source 114 (e.g., as in FIGS. 1 and 10) is modeled as an areal light source rather than as a point light source.

In each model, the F-number of the elliptical lamp 110 is 0.8, while the rectangular aperture 510 has dimensions of 6.8×5.85 mm with a collection F-number of 1.3. In the each model, the rectangular aperture 510 is located at the appropriate focal position, and is representative of the entrance 126 of the integrator 125.

FIG. 13 further depicts the focussed cone of light 520 as it emerges from the elliptical lamp 110, and a focussed cone of light 1320 that emerges from the FNL 1010 (in combination with the elliptical lamp 110). The focussed cone of light 1320 has a smaller cone angle than the focussed cone of light 520 that emerges from the elliptical lamp 110.

In one non-limiting example, the systems of FIGS. 10-13 comprise light production systems for an optical projector. In some of these embodiments, the optical projector comprises an analog optical projector, while in other embodiments, the optical projector comprises a digital optical projector, for example a digital optical projector as manufactured by Christie Digital Systems Canada, Inc., 809 Wellington St. N., Kitchener, Ontario, Canada N2G 4Y7.

Figure 14:
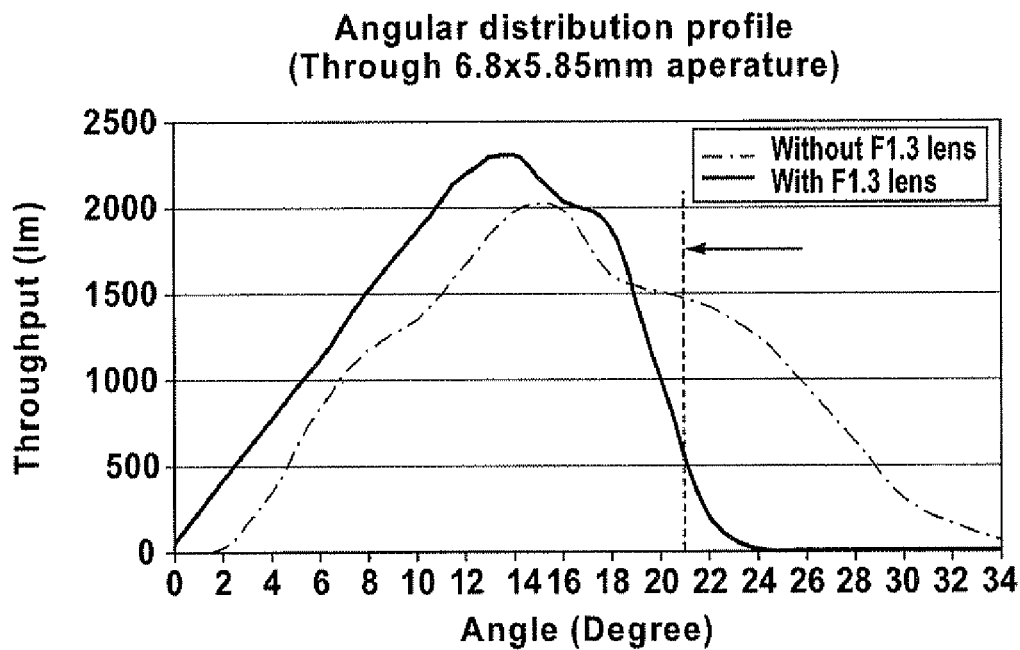
FIG. 14 depicts light distribution of light from an elliptical lamp shining through a rectangular aperture, as a function of angle, with and without a lens for effectively adjusting the F-number of an elliptical lamp, in alignment with an elliptical lamp, according to a non-limiting embodiment.
Figure 15:
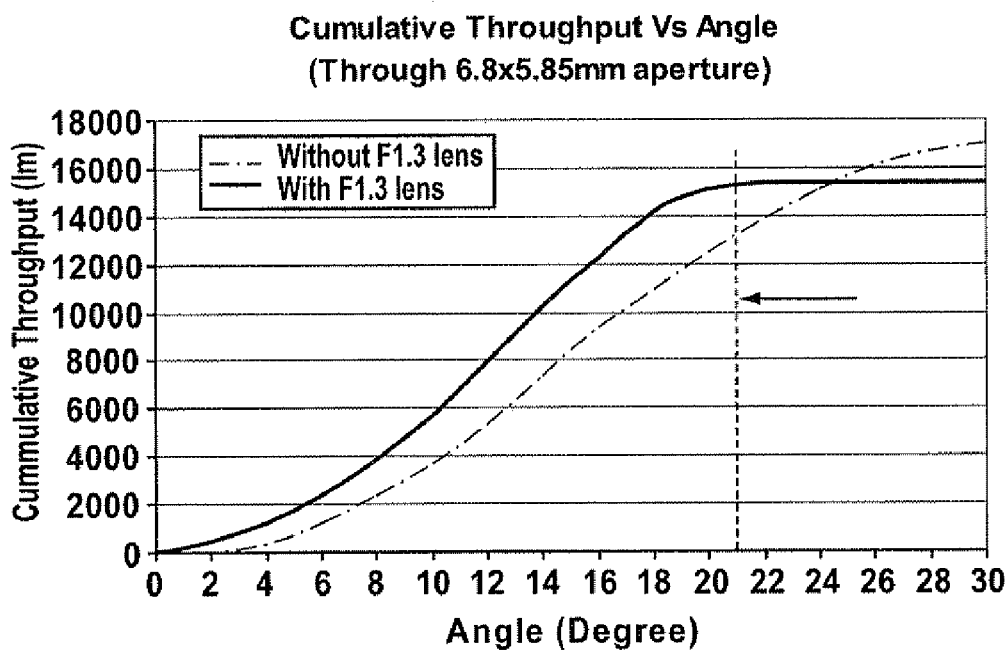
FIG. 15 depicts cumulative throughput of light from an elliptical lamp shining through a rectangular aperture, as a function of angle, with and without a lens for effectively adjusting the F-number of an elliptical lamp, in alignment with an elliptical lamp, according to a non-limiting embodiment.

FIG. 14 depicts the light distributions as a function of angle through the rectangular aperture 510 for both models. With the FNL 1010 in alignment with the elliptical lamp 110, the light distribution shifts to a lower angle as compared to the elliptical lamp 110 alone. Hence, means more light will be collected in an illumination relay system with an input F number of 1.3. FIG. 15 depicts the cumulative throughput of both models as a function of angle (i.e. an integration of the curves of FIG. 14). With the FNL 1010 in alignment with the elliptical lamp 110, the effective half angle of the elliptical lamp 110 is adjusted to approximately 21° from a half angle of grater than 30° without the FNL 1010. Hence the cone angle of the light emerging from the elliptical lamp 110 is adjusted from a higher cone angle (>30°) to a lower cone angle (~21°), demonstrating that the F-number of the elliptical lamp 110 has been adjusted from a lower F-number (0.8) to a higher F-number (1.3).

Table 2 further records the gain in light collection efficiency between the models (i.e. without the FNL 1010 in alignment with the elliptical lamp 110 and with the FNL 1010 in alignment with the elliptical lamp 110) using ray-tracing illumination software such as TracePro from Lambda Research Corporation, 25 Porter Rd, Littleton, Mass. 01460-1434, USA. Light emitted from the elliptical lamp 110 was modeled as 21251 lumens. Light emitted through the rectangular aperture 510 without the FNL 1010 in alignment was then determined to be 12460 lumens, while light emitted through the rectangular aperture 510 with the FNL 1010 in alignment was determined to be 15140 lumens. In other words, with the FNL 1010 in alignment, as in FIGS. 10-13, an increase in light collection efficiency of 21.5% was achieved.

TABLE 2

Total from Lamp = 21251 lm

| | With FNL (lm) | Without FNL (lm) | Improvement |
|---|---|---|---|
| Light through Rectangular Aperture | 15140 | 12460 | 21.5% |
| Light Collection Efficiency | (71.2%) | (58.6%) | |

In addition, to the higher light collection efficiency, the contrast ratio of the projector can be enhanced. FIG. 14, further shows that the peak of the light emitted from the elliptical lamp 110 shifts from 15° to 13° when the FNL 1010 is in alignment. Hence, more light is now at lower cone angles and minimizes the amount of light overlapping between the on-state and off-state light inside the projector.

Figure 16:
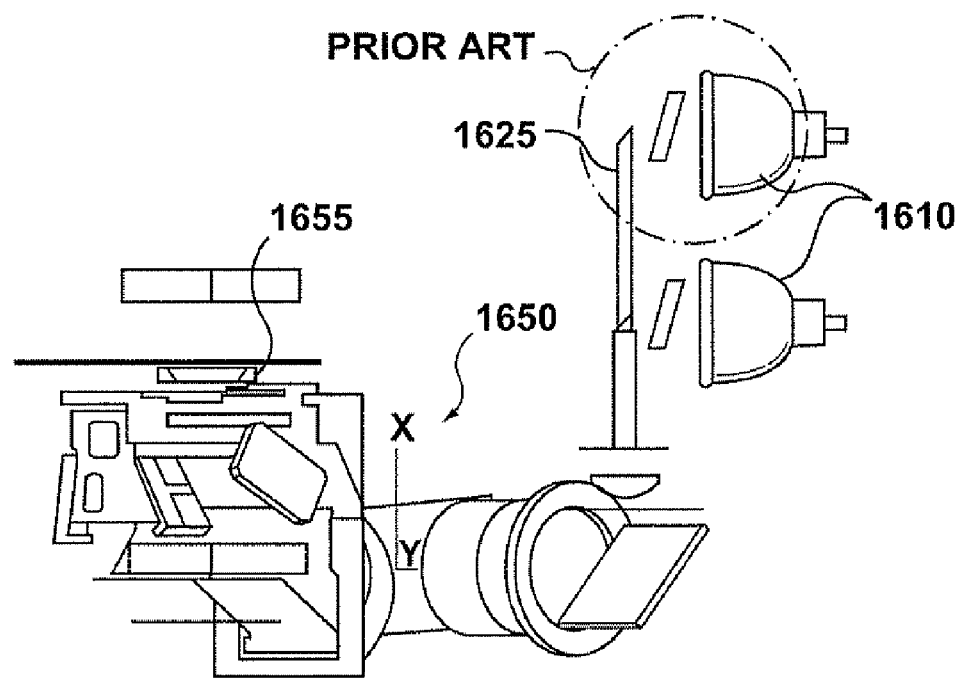
FIG. 16 depicts a projector, comprising at least one lamp arranged onto an entrance face of an integrator, the arrangement according to the prior art, and the integrator according to a non-limiting embodiment.
Figure 17:
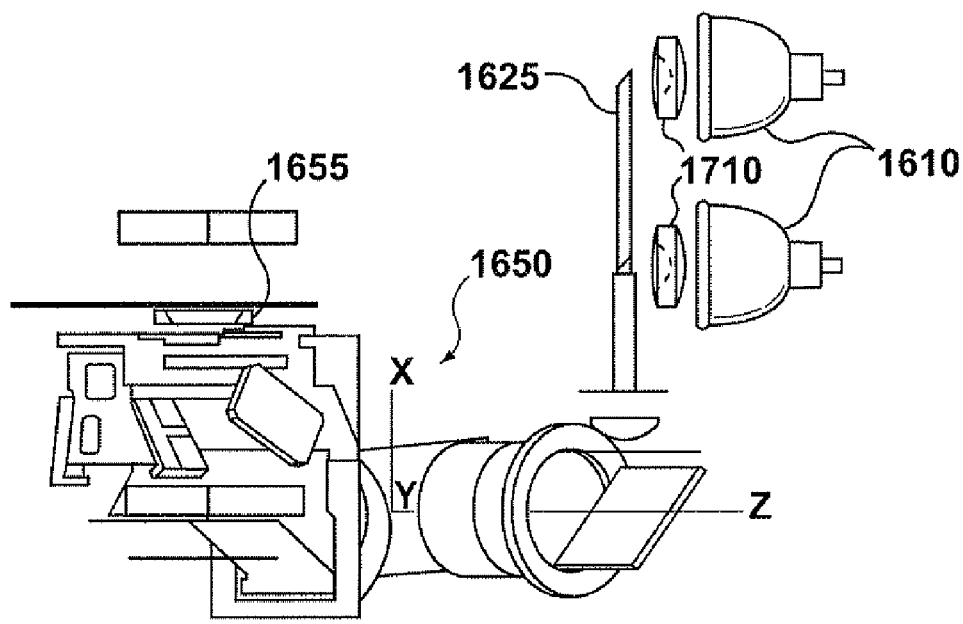
FIG. 17 depicts a projector, according to a non-limiting embodiment.

FIG. 16 depicts a schematic of a light collection system of a projector comprising two elliptical lamps 1610, similar to the elliptical lamp 110, focussed on two entrances of an integrator 1625 similar to the integrator 725. The integrator 1625 channels light from each of the elliptical lamps 1610 perpendicular to the light output path of each of the elliptical lamps 1610 to illumination relay optics 1650, which subsequently magnifies and channels the light to a light modulator 1655. The arrangement between each of the elliptical lamps 1610 and each corresponding entrance to the integrator 1625 is generally according to the prior art. In contrast, FIG. 17 shows how two FNLs 1710, similar to the FNL 1010 210, can be incorporated into the system of FIG. 16 to improve the light collection efficiency of the projector. In modelling each system, it was found that the dual-lamp projector of FIG. 16 can only achieve 7739 lm. In contrast, when the FNLs 1710 are used to effectively adjust the F-number of the elliptical lamps 1610 to 1.3, as in FIG. 17, the total screen throughput now becomes 9482 lm, 22.5% brighter than before.

In one non-limiting example, the systems of FIGS. 10-13 comprise a light production system for an optical projector. In some of these embodiments, the optical projector comprises an analog optical projector, while in other embodiments, the optical projector comprises a digital optical projector, for example a digital optical projector as manufactured by Christie Digital Systems Canada, Inc., 809 Wellington St. N., Kitchener, Ontario, Canada N2G 4Y7.

In some embodiments the FNL 1010 may be adapted for mounting between the elliptical lamp 110 and the integrator 125. In other embodiments, the FNL 1010 may be adapted for mounting to the elliptical lamp 110, for example by gluing the FNL 1010 to the aperture of the elliptical lamp 110 In some of these embodiments, a suitable spacer may be provided to protect the FNL 1010 from the heat of the elliptical lamp 110, and to ensure a suitable optical path of the light rays 150.

Figure 18:
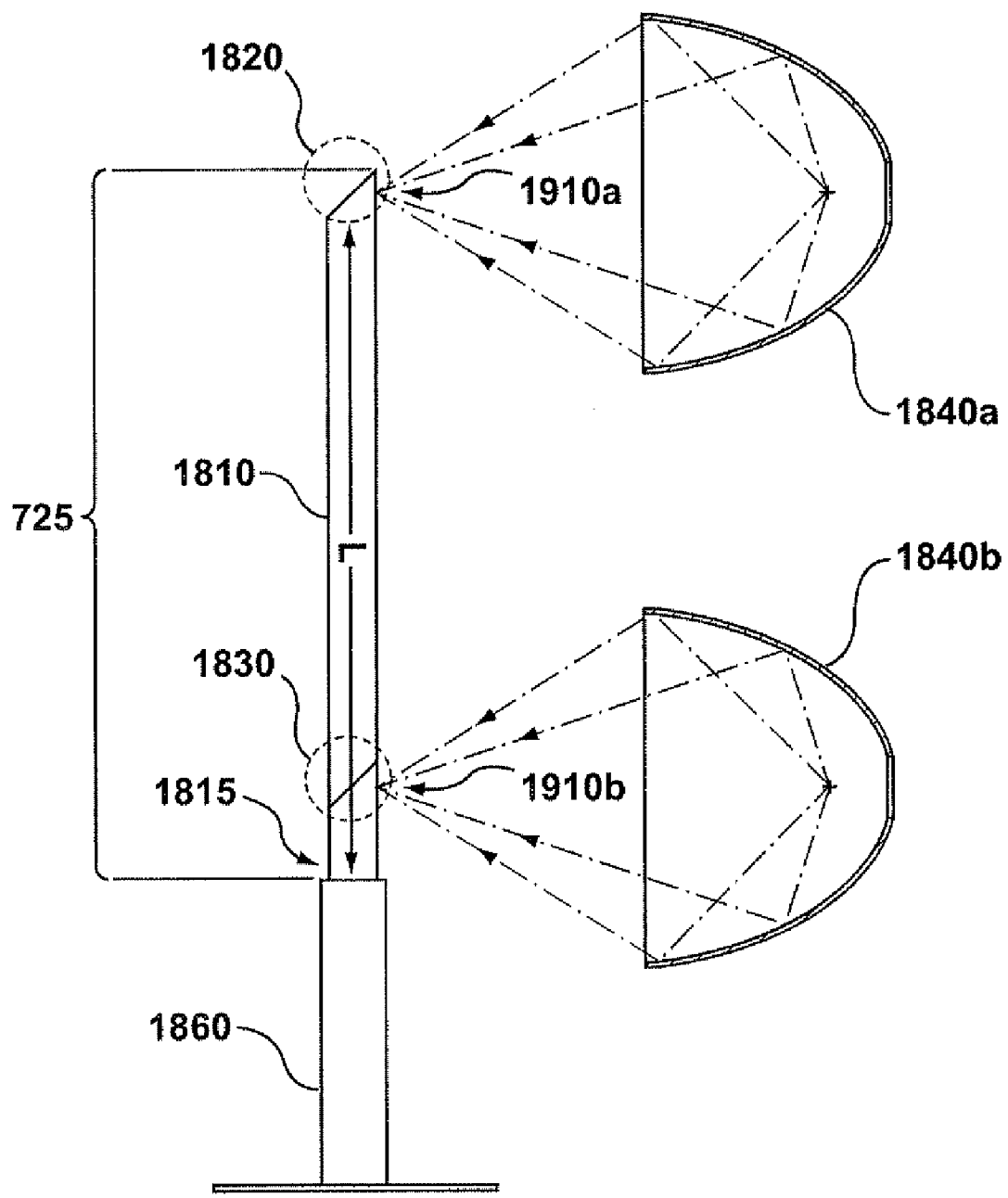

Attention is now directed to FIG. 18 which depicts the integrator 725, according to a non-limiting embodiment. The integrator 725 comprises a body 1810 for integrating light, the body 1810 having a length L. In some embodiments, the length L is suitable for integrating light that enters the body 1810. The integrator 725 also comprises a light egress end 1815. The integrator 725 further comprises a first light entrance device 1820 for accepting light from a first lamp 1840a into the body 1810. The first light entrance device 1820 comprises a light entrance face 1910a (for further detail, see FIG. 19). The first light entrance device 1820 is located distal from the light egress end 1815. The integrator 725 further comprises a second light entrance device 1830 for accepting light from a second lamp 1840b into the body 1810. The second light entrance device 1830 comprises a second light entrance face 1910b. The second light entrance device 1830 is laterally displaced from the first light entrance device 1820 in a direction generally perpendicular to the first entrance face 1910a, such that light from the lamps 1840a and 1840b independently enter the body 1810 via the light entrance devices 1820 and 1830, the light exiting the light egress end 1815. Hence, each light entrance device 1820 and 1830 each occupies about half the cross-sectional area of the integrator 725.

In some embodiments, the light egress end 1815 is enabled for one of abutment to, or insertion into, an input region of a hollow tunnel 1860, as described below with reference to FIGS. 23 and 24. An example of the hollow tunnel 1860 is disclosed in Applicant's U.S. Pat. No. 6,205,271, incorporated herein by reference. In general, the hollow tunnel 1860 comprises planar interior mirrored wall surfaces for extending the light egress end 1815 to a focal plane which is beyond the light egress end 1815 of the integrator 725, such that the length L may be shortened.

Figure 19:
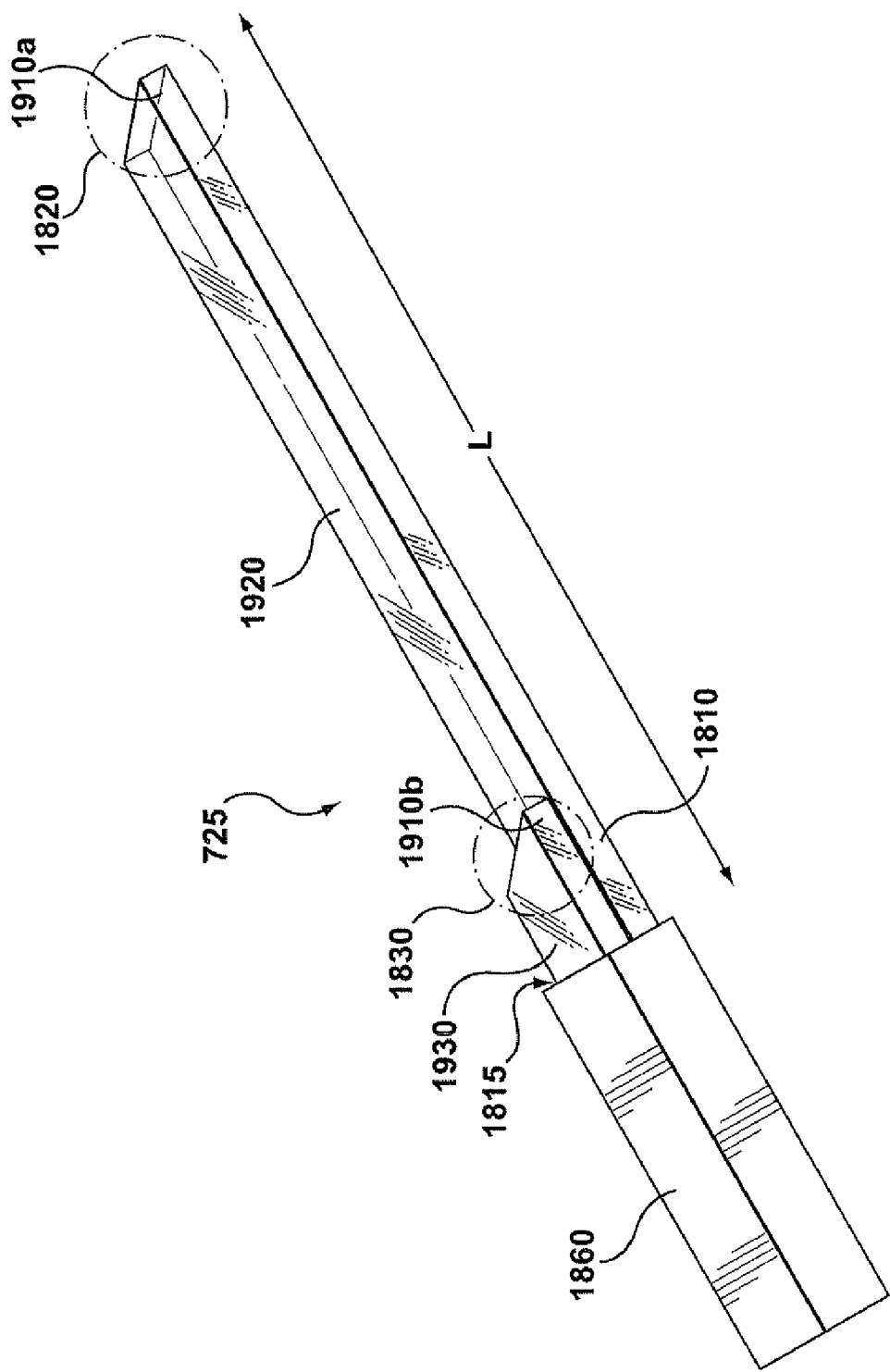

FIG. 19 depicts a perspective view of the integrator 725, according to a non-limiting embodiment, with like elements from FIG. 18 having like numbers. From FIG. 19, it is understood that in some embodiments the first and second entrance faces 1910a and 1910b face in the same direction, the second light entrance device 1830 being further displaced along the body 1810 towards the light egress end 1815, such that each of the lamps 1840a and 1840b (e.g. see FIG. 18) may be located on the same side of the integrator 725, displaced from one another along the body 1810. Indeed, the first and second light entrance devices 1820 and 1830 being displaced from one another along the body 1810 is generally enabled by the first and second light entrance device 1820 and 1830 being laterally displaced from one another, in a direction perpendicular to the light entrance faces 1910a and/or 1910b. Hence, when the integrator 725 and lamps 1840a and 1840b are incorporated into a projection system (e.g. similar to FIG. 7), the lamps 1840a and 1840b may be separated by a distance that delocalizes their combined heat output. Further, the location of each of the lamps 1840a and 1840b on the same side of the integrator 725 is a generally convenient physical arrangement, which simplifies access to the lamps 1840a and 1840b when one or both of them burn out. This further simplifies the design of a projector.

Again with reference to FIG. 19, in some embodiments, the body 1810 comprises a first section 1920 extending from the first light entrance device 1820 to the light egress end 1815 and a second section 1930 extending from the second light entrance device 1830 to the light egress end 1815. In some embodiments, the first section 1920 is longer than the second section 1930. In other embodiments the first section 1920 and the second section 1930 are optically coupled together along the length L. This enables light that enters each of the light entrance devices 1820 and 1830, to mix within the body 1810. In some embodiments, the first section 1920 and the second section 1930 can be fastened together via at least one mechanical fastener (not depicted).

However, as depicted in FIG. 20 and 21, in other embodiments, the body 1810 comprises a single section. In some embodiments, the single section may be formed by bonding together the first section 1920 and the second section 1930 together via a suitable optical epoxy and/or a suitable optical cement, such that the first section 1920 and the second section 1930 are optically coupled together. In other embodiments, the single piece may be formed by manufacturing the body 1810 from a single piece of suitable material, and/or by using a suitable mold. In embodiments where the body 1810 comprises a single section, the use of mechanical fasteners is effectively eliminated and the body 1810 further comprises a light pre-mixing zone to pre-integrate the light from each of the lamps 1840a and 1840b, prior to entry into the hollow tunnel 1860. Furthermore, in some of these embodiments, an exit face 2110 of the light egress end 1815 may be used as an object plane of a relay system in a projector (for example, as in FIG. 7), and the hollow tunnel 1860 may be eliminated, for example as in FIGS. 20b and 21b.

In the embodiments depicted in FIGS. 18 through 21, each of the light entrance devices 1820 and 1830 comprise a prism having an entrance plane that coincides with the first and second light entrance faces 1910*a* and 1910*b*, respectively, and an inclined plane opposite the entrance plane, such that light can enter the entrance plane and reflect from the inclined plane towards the light egress end 1815. In some embodiments, the inclined plane forms an angle with a light entrance path normal to the entrance plane that is at least a total internal reflection angle. In other words, light that enters the prism in a direction normal to the entrance plane reflects from the inclined plane towards the light egress end 1815

In some embodiments, the inclined plane comprises a reflector for reflecting light towards the light egress end 1815. The reflector can comprise at least one of a metal coating, a dielectric coating, a mirror and a cold mirror. A coating can be chosen that is suitable for a given application. For example, if the lamps 1840*a* and 1840*b* are low power lamps, a metal coating can be sufficient given the heat produced by the lamps 1840*a* and 1840*b*, and can provide light reflection >98%. However, if the lamps 1840*a* and 1840*b* are high power lamps, a dielectric coating can be a better choice for handling high heating by the lamps 1840*a* and 1840*b*. In some embodiments, a cold mirror coating can be a good candidate to reduce reflection of infra-red light from the lamps 1840*a* and 1840*b* into the body 1810.

In some embodiments, the inclined plane forms an angle with the flat plane of 45°. For example, in embodiments where the integrator 725 comprises the first section 1920 and the second section 1930, each of the first section 1920 and the second section 1930 can comprise a 45° chop at a light input end (adjacent to each respective entrance face 1910) for light path folding. Hence, in these embodiments, each prism associated with each of the light entrance devices 1820 and 1830 is integral with the body 1810. Such an arrangement may also be integrated into embodiments where the body 1810 comprises a single section.

However, in other embodiments, each prism associated with each of the light entrance devices 1820 and 1830 may be a separate element from the body 1810. An example of such embodiments is provided in FIG. 25, described below. In some of these embodiments, each of the prisms may be optically coupled to the body 1810, for example via a suitable optical epoxy and/or a suitable optical cement.

Figure 22:
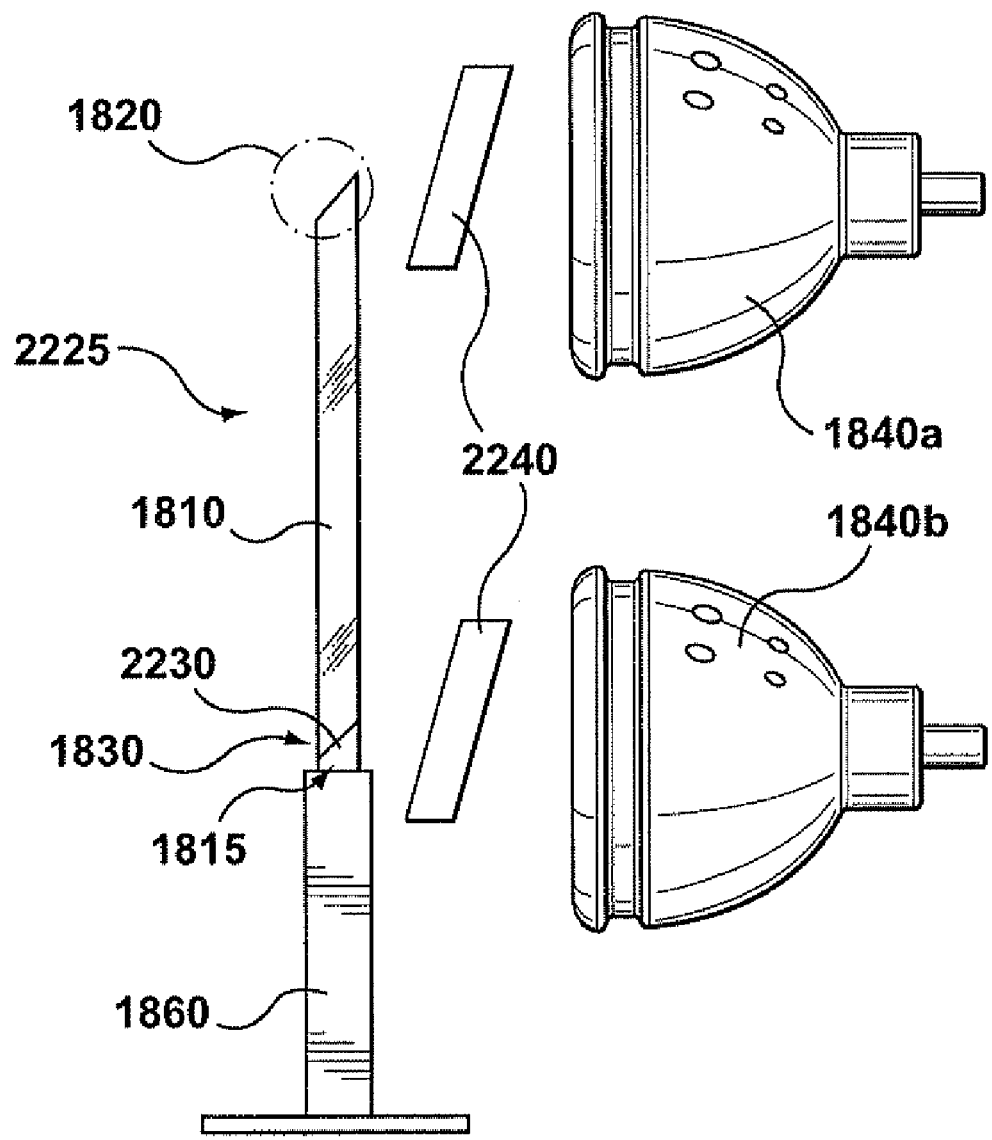

Attention is now directed to FIG. 22, which depicts a non-limiting embodiment of an integrator 2225 similar to the integrator 725, with like elements being depicted with like numbers. In these embodiments, the integrator 2225 comprises the body 1810, and the light entrance devices 1820 and 1830. However, the second light entrance device 1830 comprises a prism 2230 located at the light egress end 1815 of the integrator 2225 such that light is reflected from the inclined plane of the prism and out the light egress end 1815. Integration of light occurs within the second light entrance devices 1830. However, as the exit face of the prism 2230 is substantially flush with the light egress end 1815, light exiting the prism 2230 via the exit face of the prism 2230 is not integrated by the body 1810. However, in embodiments where the second light entrance device 1830 is optically coupled to the body 1810, integration of light exiting the light entrance device 1830 via a wall adjacent to the body 1810, may occur within the body 1810. Such embodiments are generally integrated into a projector in conjunction with the hollow tunnel 1860 to ensure further integration of light from both lamps 1840*a* and 1840*b*. Alternatively, the hollow tunnel 1860 may be replaced by an integrator rod, The element 2240 comprises an optional infrared filter for use in a projector system, to prevent heating of the integrator 2225 by the lamps 1840*a* and 1840*b*.

Figure 23:
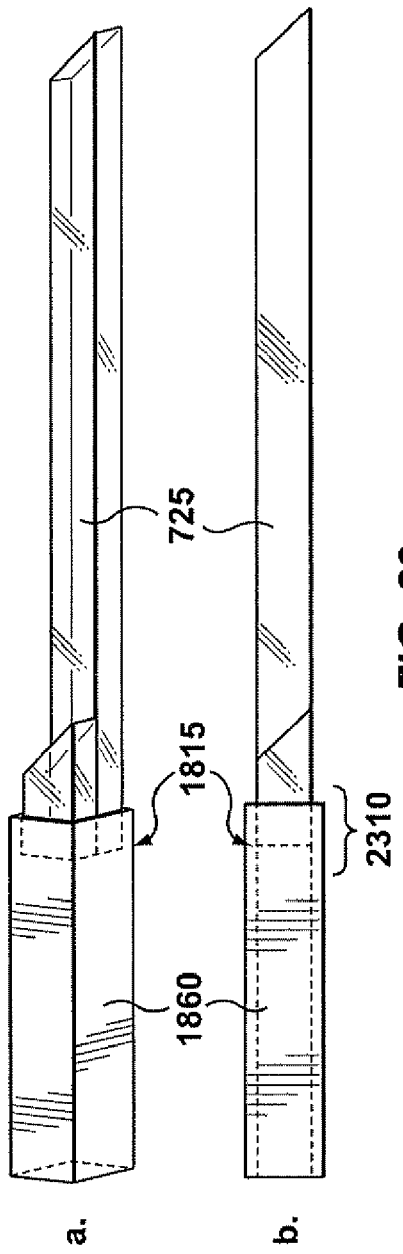

Turning now to embodiments that include the hollow tunnel 1860, in some embodiments, the light egress end 1815 may be adapted for insertion into the hollow tunnel 1860, as depicted in FIG. 23. The insertion region is generally indicated at 2310. In these embodiments, the risk of light loss between the integrator 725 and the hollow tunnel 1860 is reduced, as the hollow tunnel 1860 acts as an extension of the light propagation through the integrator 725.

Figure 24:
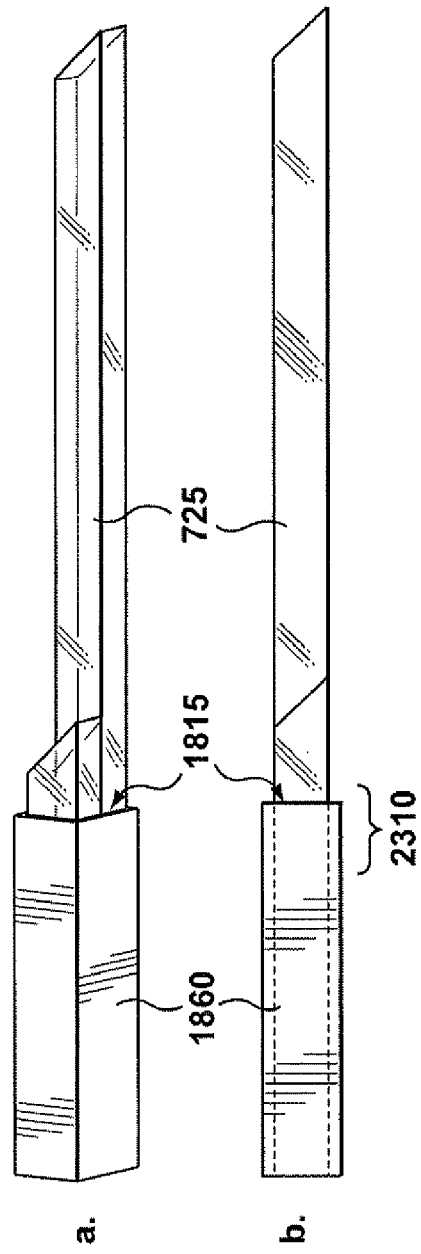

In other embodiments, as depicted in FIG. 24, the light egress end 1815 of the integrator 725 can be flush with the hollow tunnel 1860. In some of these embodiments, the hollow tunnel 1860 and/or the integrator 725 may be adapted for rotation with respect to one another. As the exit face of the hollow tunnel 1860 generally acts as the object plane of an illumination relay system when integrated into a projector, in order to map this object plane onto a light modulator (e.g. an LCD or a DMD), rotation of the hollow tunnel 1860 enables alignment between the exit face and the light modulator. In some embodiments, the degree of rotation is on the order of a few microns.

Figure 25:
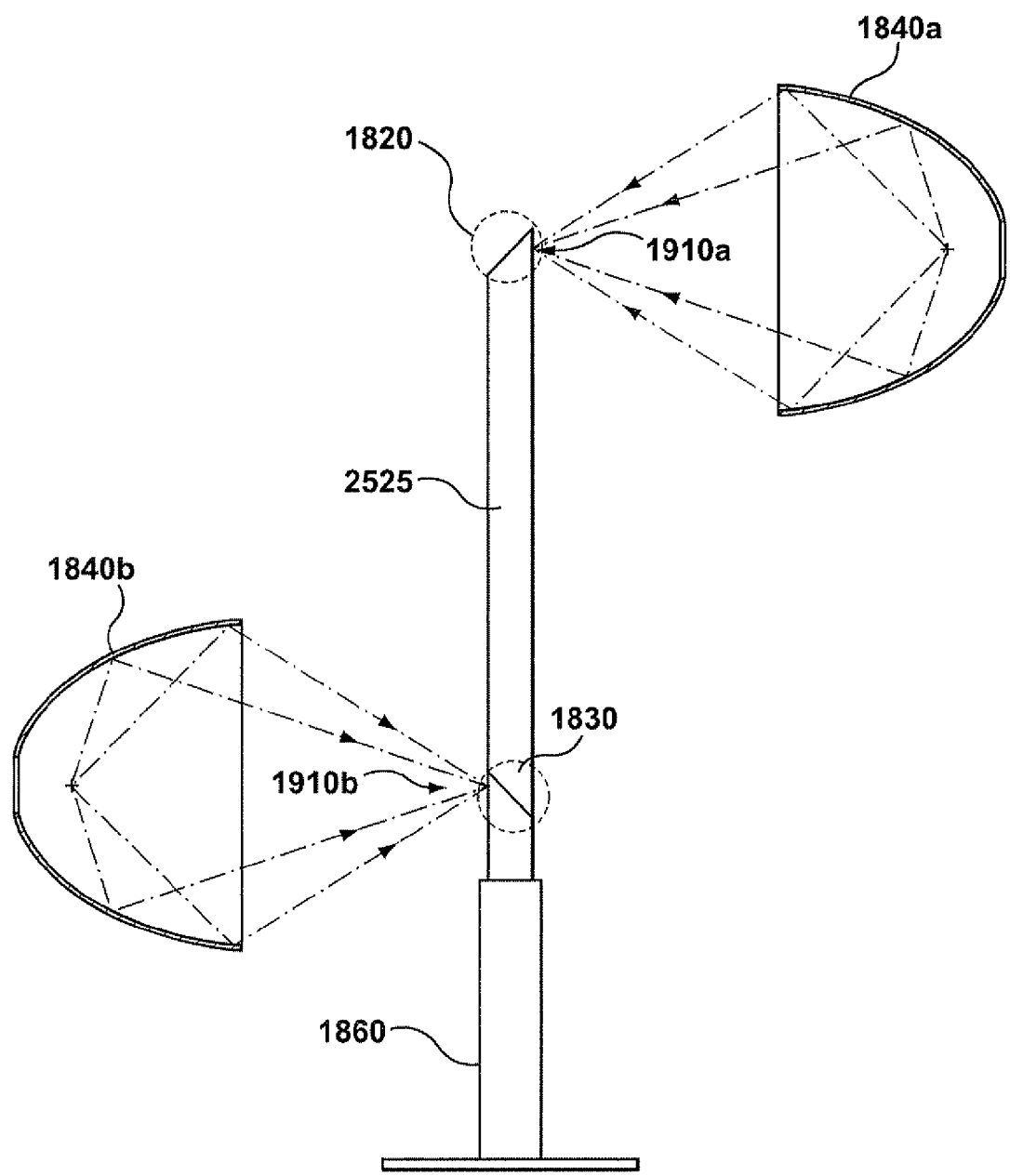

FIG. 25 depicts another non-limiting embodiment of an integrator 2525, similar to the integrator 725, however in these embodiments the first and second entrance faces 1910*a* and 1910*b* of each of the light entrance devices 1820 and 1830, respectively, face in opposite directions, such that each of the lamps 1840*a* and 1840*b*, may be located on opposites sides of the integrator 2225. Hence, instead of facing the integrator 2525 in the same direction, as in FIG. 18, the lamps 1840*a* and 1840*b* face in opposite directions. This provides versatility with regard to where the lamps 1840*a* and 1840*b* can be located relative to one another.

Figure 26:
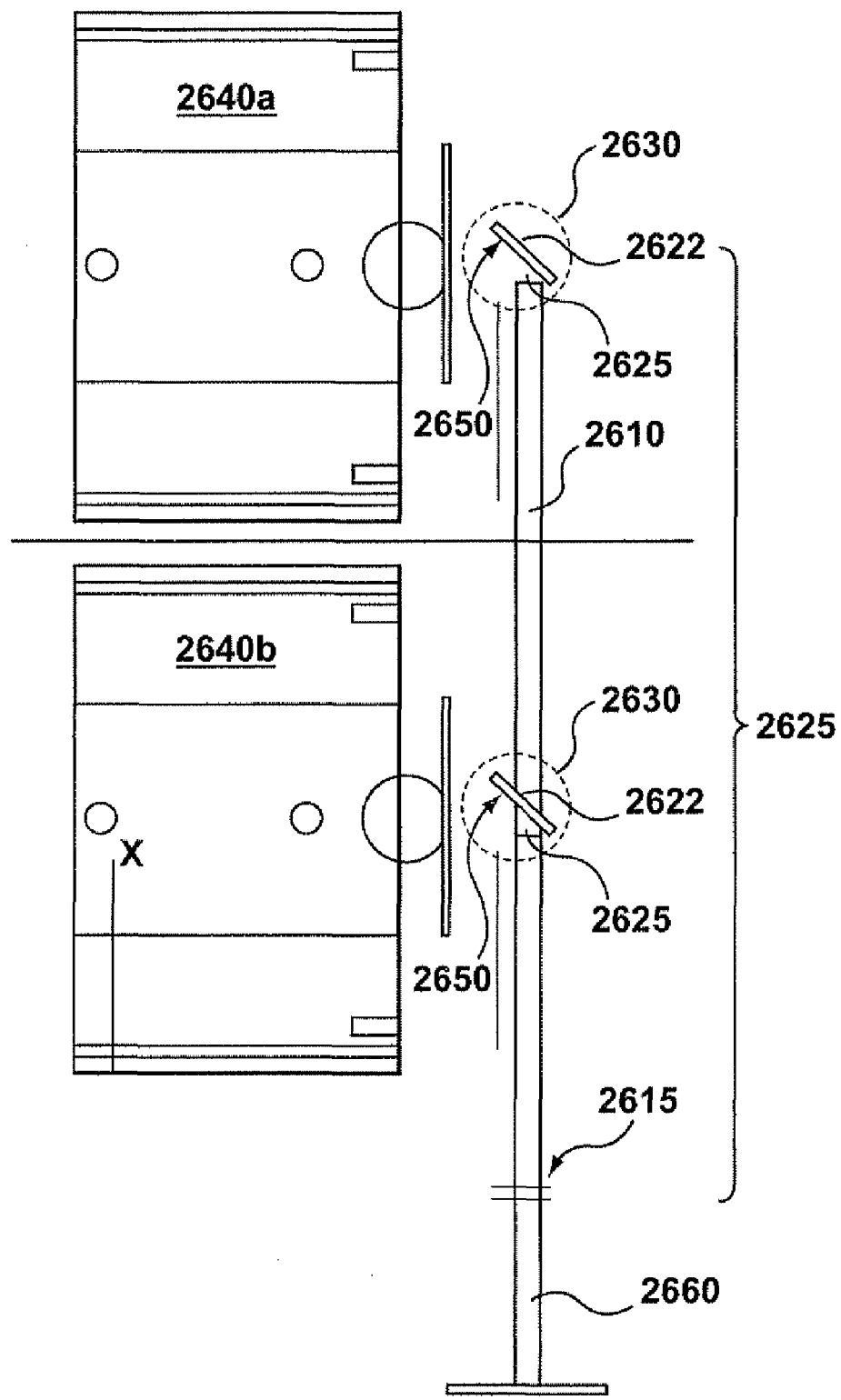

FIG. 26 depicts another non-limiting embodiment of an integrator 2625 comprising a body 2610 for integrating light entered therein, similar to the body 1810, the body 2610 having a light egress end 2615, similar to the light egress end 1815. The integrator 2625 further comprises first light entrance device 2620 and a second light entrance device 2630, each light entrance device 2620 and 2630 located relative to one another in a manner similar to the light entrance devices 1820 and 1830. However, each light entrance device 2620 and 2630 comprises a mirror 2622, the reflective plane of the mirror 2622 comprising a light entrance face 2650 of the light entrance devices 2620 and 2630. Bach mirror 2622 is positioned at an angle to a corresponding light accepting face 2626 of the body 1710 such that light from a corresponding lamp 2640*a* and 2640*b* reflects from the mirror 2622 and into the corresponding light acceptance face 2626. Each light acceptance face 2626 is generally parallel to an exit face of the light egress end 1815, such that light entering the light acceptance face 2626 is integrated as it travels along the body 1710 and exits at the light egress end 1715.

Hence, in these embodiments, instead of relying on the inclined plane of the integrator 725 for folding the light path, the mirror 2622 is used, The mirror 2622 can be dielectric, metallic or cold mirror coated, as described above, depending on various applications. These embodiments can be used in high power applications where coating the inclined face of the integrator 725 is not feasible due to the intense heat that may be present, and better IR light management is desired. As in previous embodiments, the light egress end 2615 can be enabled for one of abutment to or insertion into an input region of a hollow tunnel 2660 similar to the hollow tunnel 1860. Further, in some embodiments, one of the first and second light entrance devices 1820 and 1830 can comprise a mirror, while the other comprises a prism.

FIG. 26 further depicts lamps 2640*a* and 2640*b* as Cermax Xe lamps. While elliptical lamps (e.g. lamps 1840*a* and

1840*b*) were depicted in FIGS. 7, 8, 16, 17, 18, 22 and 25, the type of lamp that may be used with embodiments of integrators described herein is not particularly limiting. Hence any suitable lamp may be used with any of the embodiments of integrators described herein, as desired, including but not limited to Cermax Xe lamps, UHP lamps with elliptical reflectors, lamps with parabolic reflectors (in conjunction with an additional condenser lens for focussing light onto an entrance face 1910 an integrator).

Figure 27:
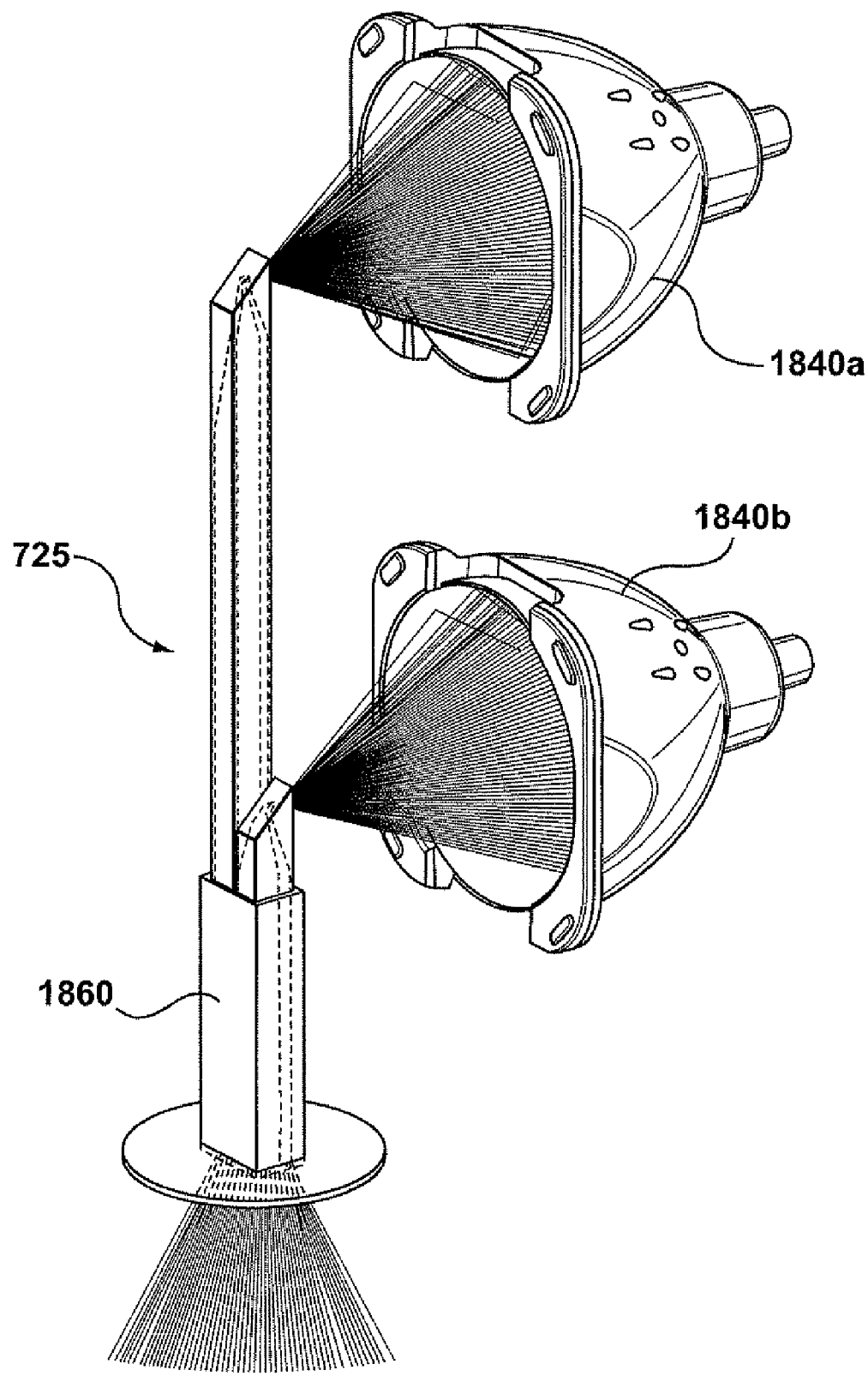
FIG. 27 depicts a ray trace diagram of light emitted from two lamps entering a dual lamp integrator, according to a non-limiting embodiment.

In order to demonstrate the performance of the integrator 725, two non-limiting models were created. In the first model, a first integrator similar to the integrator 725 was modeled, having, however only one light entrance device similar to the light entrance device 1820. Hence the only one light entrance device has twice the area of the light entrance device 1820. In other words, the light entrance device on the first integrator modeled occupies the entirety of the cross-sectional area of the first integrator, In the first model, light from a single lamp (similar to the lamp 1840*a*) was impinging on the light entrance device (i.e. a single lamp system). In the second model, the integrator 725 was modeled with light from two lamps, similar to the lamps 1840*a* and 1840, each impinging on light entrance devices 1820 and 1830, respectively (i.e. a dual lamp system). In each model, the light exits from the respective integrator and into the hollow tube 1860. FIG. 27 depicts a ray trace diagram of light emitted from two lamps entering the dual lamp integrator (integrator 725), according to the second model.

Table 3 tabulates the results of each model.

TABLE 3

|  | Total from lamp(s) (lm) | Hollow Tunnel output (lm) | Coupling Efficiency |
| --- | --- | --- | --- |
| Single lamp | 21579 | 16629 | 77.06% |
| Dual lamp | 43158 | 28024 | 64.93% |
| Dual Vs Single | — | 1.69X | — |

From Table 3, it is understood that each lamp in each model emitted 21,579 lumens. Hence, 21,579 lm was input into the single lamp integrator, with 16,629 lm emitted from the hollow tunnel 1860, for a coupling efficiency of 77.06%. Further, 43,158 lm (e.g. 2×21,579=43,158) was input into the dual lamp integrator (integrator 725), with 21,579 lm input into each light entrance device 1820 and 1830. In this model, 28,024 lm were emitted from the hollow tunnel 1860, for a coupling efficiency of 64.93%. Hence, the dual lamp integrator emitted 1.69 times the light of the single lamp integrator. This represents a gain of more than 20% over the prior art systems (based on a 1.4 times multiplier).

Further, in the model, both light sources are mounted parallel to each other with the light focused on the front face of each light entrance device. The light was transmitted, reflected and traveled down through the respective integrator and the hollow tunnel. Both light egress ends of each integrator are flushed and are attached to the hollow tunnel. In the dual lamp integrator, a pre-integration of light from both lamps occur, and the hollow tunnel further served for post-integration of light. This combination can created a more uniform image at 90%.

Due to the pre-integration by the dual lamp integrator, the hollow tunnel can be shortened. Previously, a hollow tunnel was in the 50-60 mm range. With the arrangement of the dual lamp integrator and the hollow tunnel, the hollow tunnel with a length of 40 mm can bring sufficient uniformity on a light modulator in a projector and in an image projected onto a screen. Due to the shorter tunnel, light loss due to non-perfect reflection of the mirror surfaces can be reduced.

It should be understood that embodiments of integrators described herein can be enabled for accepting light from more than two lamps into a body for integration by providing more than two light entrance devices in the integrators. For example, the cross-section of a given integrator can be divided laterally into a number of areas equal to the number of lamps for which light integration is desired. Each area can be provided with a light entrance device similar to the light entrance device 1820 and/or the light entrance device 2620. Further, each light entrance device can be displaced from one another along the body of the integrator (e.g. along the body 1810 of the integrator 725). Hence, embodiments of integrators described herein are limited only to a minimum of two light entrance devices incorporated therein. Furthermore, some light entrance faces of each light entrance device, respectively, can face in opposite directions to one another, while some light entrance faces of each light entrance device, respectively, can face in the same direction to one another.

Figures 28A, 28B:
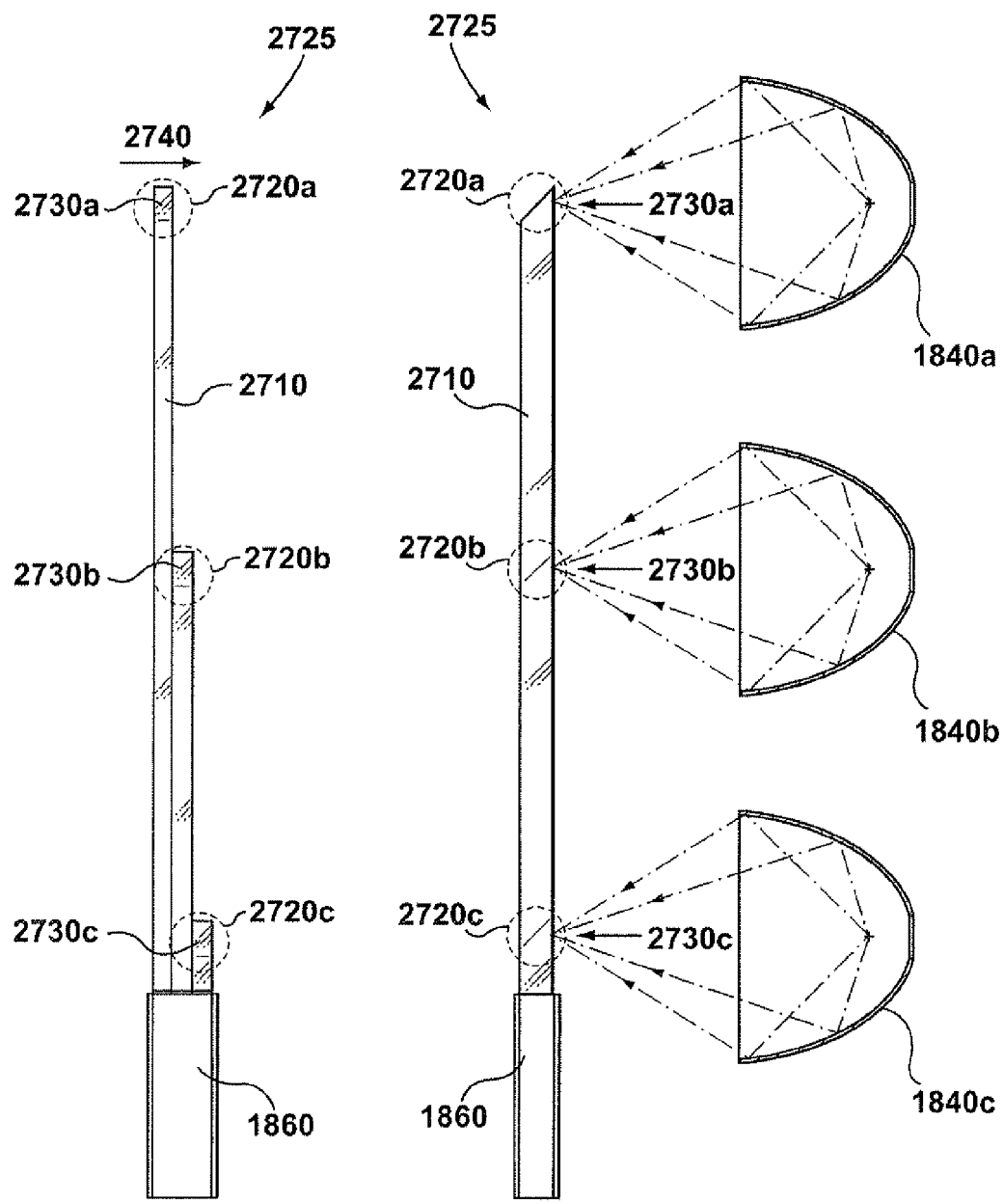

For example, as depicted in FIGS. 28*a* and 28*b*, an integrator 2725 comprises light entrance devices 2720*a*, 2720*b* and 2720*c*, each comprising a light entrance face 2730*a*, 2730*b* and 2730*c*, respectively. Each of the light entrance devices 2720*a*, 2720*b* and 2720*c* are displaced from one another along a body 2710, and laterally displaced from one another in a direction 2740 perpendicular to the light entrance faces 2730*a*, 2730*b* and 2730*c*. FIG. 28*a* depicts the integrator 2725 from the perspective of a direction facing the entrance faces 2730*a*, 2730*b* and 2730*c*, while FIG. 28*b* depicts the integrator 2725 from a perspective perpendicular to the direction 2740, such that light entrance device 2720*a* is depicted in front of light entrance devices 2720*b* and 2720*c*.

From FIG. 28*b*, it is understood that each of the light entrance faces 2730*a*, 2730*b* and 2730*c* face in the same direction such that lamps 1840*a*, 1840*b* and 1840*b* can be located on the same side of the integrator 2725.

However, the direction in which each of the light entrance faces 2730*a*, 2730*b* and 2730*c* are facing is not particularly limiting. For example, attention is now directed to FIGS. 29*a* and 29*b*, which depicts an integrator 2825 similar to the integrator 2725, with like elements depicted with like numbers, and comprising a body 2810. As depicted in FIGS. 29*a* and 29*b*, one or more of the light entrance faces 2730*a*, 2730*b* and 2730*c* can face in opposite directions such that one or more of the lamps 1840*a*, 1840*b* and 1840*b* can be located on opposite sides of the integrator 2825, along the body 2810. FIG. 29*a* depicts the integrator 2825 from the perspective of a direction facing the entrance faces 2730*a* and 2730*c*, while FIG. 29*b* depicts the integrator 2825 from a perspective perpendicular to the direction 2740, such that light entrance device 2730*b* is depicted in front of light entrance devices 2720*a* and 2720*c*.

From FIG. 29*a* and 29*b* it is understood that the light entrance face 2730*b* is facing in a direction opposite that of light entrance faces 2730*a* and 2730*c*. Hence, the lamp 1840*b* can be located on a side opposite lamps 1840*a* and 1840*c*. This enables the body 2810 to be shortened relative to body 2710, saving on materials and hence cost.

Figure 30:
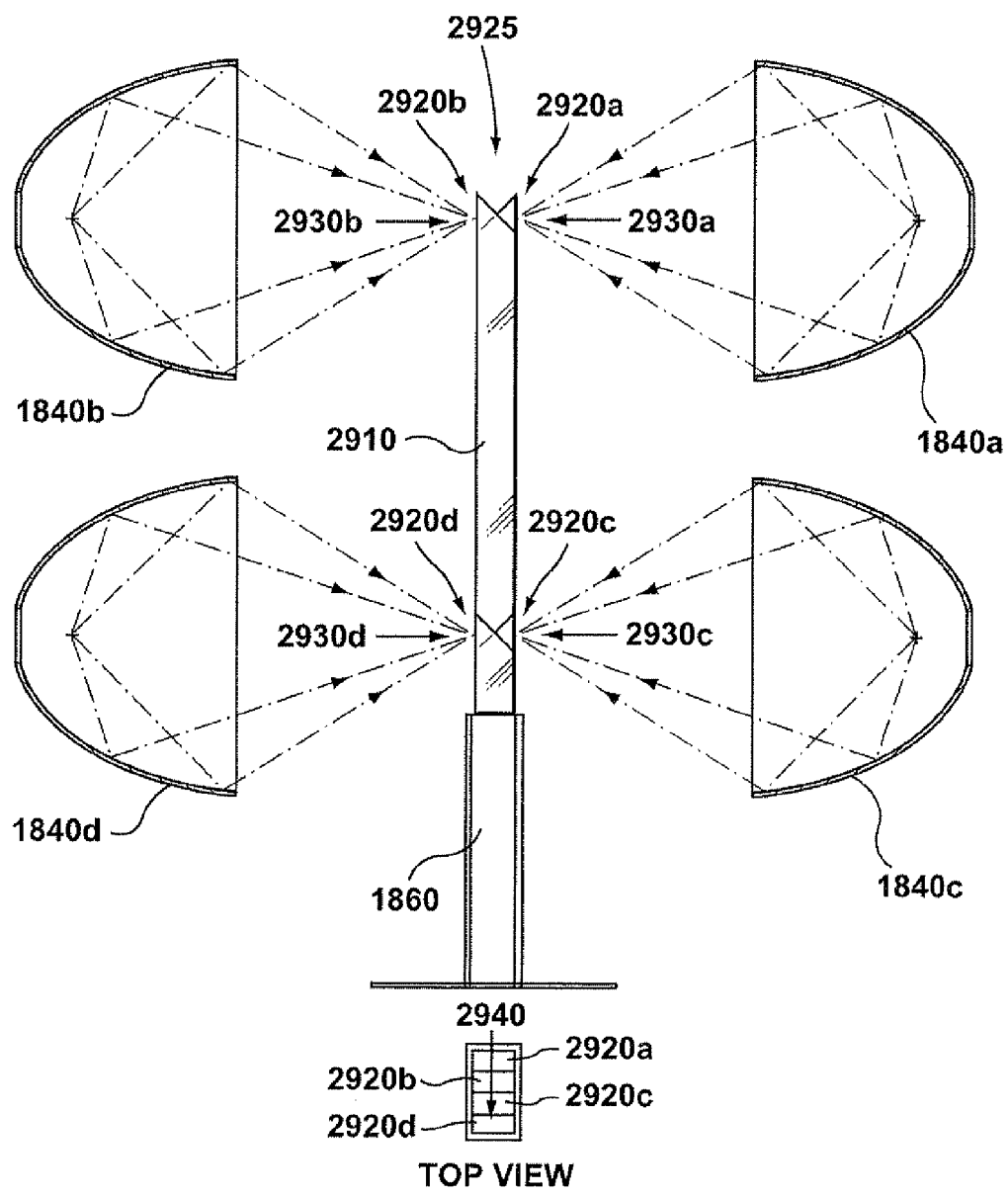

In general, the integrators 2725 and 2825 may be further enabled to accept light from an arbitrary number of lamps. For example, attention is now directed to FIG. 30, which depicts a non-limiting embodiment of an integrator 2925 enabled to accept light from four lamps 1840*a*-1840*d*, via four light entrances devices 2920*a*-2920*d*, similar to the light entrance devices 2720 of FIGS. 29*a* and 29*b*, each of the light entrances devices 2920*a*-2920*d* having light entrance faces 2930a-2930d, respectively. Light entrance devices 2920c and 2920d are displaced from light entrance devices 2920a and 2920b along a body 2910. Each of the light entrance device 2930a-2930b are laterally displaced from one another in a direction 2940 perpendicular to the light entrance faces 2930, as depicted in the TOP VIEW of FIG. 30. However, the pairs of light entrance devices 2920a and 2920b, and 2920c and 2920d, are each aligned along the body 2910, though facing in opposite directions, such that opposing pairs of lamps (1840a/1840b, and 1840c/1840d) may be arranged along the body 2910.

Figure 31:
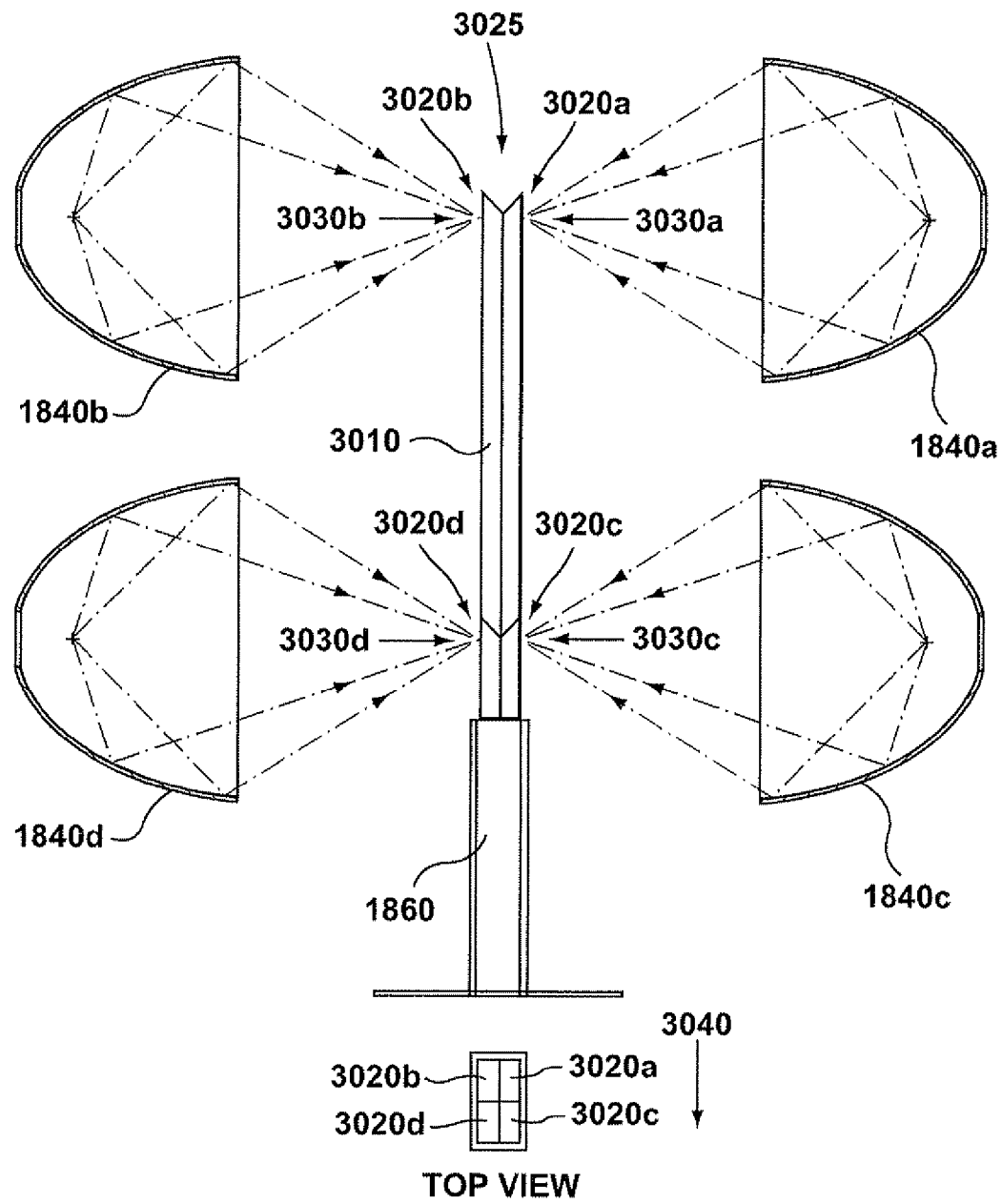

In another non-limiting embodiment, as depicted in FIG. 31, an integrator 3025 is enabled to accept light from four lamps 1840a-1840d, via four light entrances devices 3020a-3020d, similar to the light entrance devices 2720 of FIGS. 29a and 29b, having light entrance faces 3030a-3030d, respectively. Light entrance devices 3020c and 3020d are displaced from light entrance devices 3020a and 3020b along a body 3010. Light entrance device 3020c is laterally displaced from light entrance device 3020a in a direction 3040 perpendicular to the light entrance faces 3030, as depicted in the TOP VIEW of FIG. 31. Further, light entrance device 3020d is laterally displaced from light entrance device 3020b in a direction 3040 perpendicular to the light entrance faces 3030, as also depicted in the TOP VIEW of FIG. 31. However, the pairs of light entrance devices 3020a and 3020b, and 3020c and 3020d, are each aligned along the body 3010, and further displaced from one another in a direction normal to the light entrance faces 3030 (and/or a direction parallel to light incident from the lamps 1840), though facing in opposite directions, such that opposing pairs of lamps (1840a/1840b, and 1840c/1840d) may be arranged along the body 3010. In essence, the integrator 3025 is similar to integrating two integrators 725, arranged back to back.

It will now be understood by persons of skill in the art that the number of light entrance devices associated with each integrator described herein is not particularly limiting. Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A light integrator comprising:
   a body for integrating light, said body having a length and a light egress end;
   a first light entrance device for accepting light from a first lamp into said body, said first light entrance device comprising a first light entrance face, said first light entrance device located distal said light egress end; and
   a second light entrance device for accepting light from a second lamp, said second light entrance device comprising a second light entrance face parallel to said first light entrance face, said second light entrance device laterally displaced from said first light entrance device in a direction generally perpendicular to both the body length and an axis normal to said first light entrance face, such that light from said first and second lamps independently enter the integrator via said first and second light entrance devices respectively, and exit said light egress end, said second light entrance device further displaced from said first light entrance device along said body towards said light egress end, such that each of said first and second lamps may be displaced from one another along said body.

2. The light integrator of claim 1, wherein said first and second entrance faces face in the same direction.

3. The light integrator of claim 1, wherein said first and second entrance faces face in opposite directions, such that each of said first and second lamps may be located on opposites sides of said light integrator.

4. The light integrator of claim 3, wherein each of said first and second light entrance devices comprises a prism and said body comprises at least one of an integrator rod and a hollow tunnel with planar interior mirrored wall surfaces for extending said light egress end to a focal plane which is beyond said light egress end.

5. The light integrator of claim 1, wherein said body comprises a first section extending from said first light entrance device to said light egress end and a second section extending from said second light entrance device to said light egress end, said first section being longer than said second section.

6. The light integrator of claim 5, wherein said first section and said second section are optically coupled together along said length.

7. The light integrator of claim 6, wherein said first section and said second section are optically coupled together along said length via an optical epoxy.

8. The light integrator of claim 1, wherein said first section and said second section are held together via a mechanical fastener.

9. The light integrator of claim 1, wherein at least one of said first and second light entrance devices comprises a prism, having an entrance plane extending along said body, coinciding with at least one of said first and second light entrance faces, respectively, and an inclined plane opposite said entrance plane, such that light can enter said entrance plane and reflect from said inclined plane towards said light egress end.

10. The light integrator of claim 9, wherein said inclined plane forms an angle with a light entrance path normal to said entrance plane that is at least a total internal reflection angle.

11. The light integrator of claim 10, wherein said inclined plane forms an angle with said flat plane of 45°.

12. The light integrator of claim 9, wherein said inclined plane comprises a reflector for reflecting light towards said light egress end.

13. The light integrator of claim 12, wherein said reflector comprises at least one of a metal coating, a dielectric coating, a mirror and a cold mirror.

14. The light integrator of claim 9, wherein said prism is integral with said body.

15. The light integrator of claim 1, wherein at least one of said first and second light entrance device comprises a mirror angled to reflect light into a light entrance end of said body, and towards said light egress end, said mirror coincident with said first or second light entrance face respectively.

16. The light integrator of claim 1, wherein said light egress end is enabled for one of abutment to or insertion into an input region of a hollow tunnel with planar interior mirrored wall surfaces for extending said light egress end to a focal plane which is beyond said light egress end.

17. The light integrator of claim 1, further comprising at least a third light entrance device for accepting light from at least a third lamp, said third light entrance device comprising a third light entrance face, said third light entrance device laterally displaced from said second light entrance device in a direction generally perpendicular to both the body length and an axis normal to said second light entrance face, such that light from said first, second and third lamps independently enter the integrator via said first, second and third light entrance devices respectively, and exit said light egress end, said third light entrance device further displaced from said first light entrance device along said body towards said light egress end, such that each of said first, second and third lamps may be displaced from one another along said body.

18. The light integrator of claim 1, further comprising at least a third light entrance device for accepting light from a third lamp into said body, said first light entrance device comprising a third light entrance face facing in a direction opposite said first light entrance face, said third light entrance device located distal said light egress end and displaced from said first light entrance device in a direction of light from said first lamp incident on said first light entrance device, such that each of said first and third lamps may be located on opposite sides of said body.

19. A light integration system comprising,
   a first light integrator comprising:
      a body for integrating light, said body having a length and a light egress end;
      a first light entrance device for accepting light from a first lamp into said body, and said first light entrance device comprising a first light entrance face, said first light entrance device located distal said light egress end; and
      a second light entrance device for accepting light from a second lamp, and comprising a second light entrance face parallel to said first light entrance face, said second light entrance device laterally displaced from said first light entrance device in a direction generally perpendicular to both the body length and an axis normal to said first light entrance face, such that light from said first and second lamps independently enter the integrator via said first and second light entrance devices respectively, and exit said light egress end, said second light entrance device further displaced from said first light entrance device along said body towards said light egress end, such that each of said first and second lamps may be displaced from one another along said body; and
   a second light integrator arranged to accepting light from said light egress end, said second light integrator comprising,
      a hollow tunnel with planar interior mirrored wall surfaces for extending said light egress end of said first light integrator to a focal plane which is beyond said light egress end of said first light integrator.

\* \* \* \* \*